US008699416B2

(12) United States Patent
Kurokawa et al.

(10) Patent No.: US 8,699,416 B2
(45) Date of Patent: Apr. 15, 2014

(54) COMMUNICATION SYSTEM, FEMTO-CELL BASE STATION, AUTHENTICATION DEVICE, COMMUNICATION METHOD, AND MEMORY MEDIUM

(75) Inventors: Osamu Kurokawa, Tokyo (JP); Kazuki Eguchi, Tokyo (JP); Yasuo Kanazawa, Tokyo (JP); Yasuhiro Watanabe, Tokyo (JP); Hiroaki Akiyama, Tokyo (JP); Takayuki Kido, Tokyo (JP); Akatsuki Minami, Tokyo (JP)

(73) Assignees: NEC Corporation, Tokyo (JP); NEC Commuication Systems Ltd., Tokyo (JP)

( * ) Notice: Subject to any disclaimer, the term of this patent is extended or adjusted under 35 U.S.C. 154(b) by 135 days.

(21) Appl. No.: 13/133,105

(22) PCT Filed: Dec. 21, 2009

(86) PCT No.: PCT/JP2009/071249
§ 371 (c)(1),
(2), (4) Date: Aug. 23, 2011

(87) PCT Pub. No.: WO2010/074033
PCT Pub. Date: Jul. 1, 2010

(65) Prior Publication Data
US 2011/0305196 A1  Dec. 15, 2011

(30) Foreign Application Priority Data

Dec. 26, 2008  (JP) ................................ 2008-333583

(51) Int. Cl.
*H04W 4/00* (2009.01)
*H04L 12/66* (2006.01)
*H04L 12/28* (2006.01)
*H04J 3/16* (2006.01)
*H04W 40/00* (2009.01)

(52) U.S. Cl.
USPC ........... 370/328; 370/338; 370/352; 370/401; 370/466; 455/445

(58) Field of Classification Search
None
See application file for complete search history.

(56) References Cited

U.S. PATENT DOCUMENTS

2006/0114885 A1*  6/2006  Baek et al. ..................... 370/352
2006/0286984 A1* 12/2006  Bonner .......................... 455/445
(Continued)

FOREIGN PATENT DOCUMENTS

JP  2006525762 A  11/2006
JP  2008-160400 A   7/2008
(Continued)

OTHER PUBLICATIONS

International Search Report for PCT/JP2009/071249 mailed Mar. 30, 2010.
3GPP TS 33.234 V8.0.0, Technical Specification Group Service and System Aspects; 3G Security; Wireless Local Area Network (WLAN) interworking security (Release 8), Dec. 2007.
3GPP TS 24.008 V8.2.0, Technical Specification Group Core Network and Terminals; Mobile radio interface Layer 3 specification; Core network protocols; Stage 3 (Release 8), Jun. 2008, pp. 76-83, 106-119 and 216-218.

(Continued)

*Primary Examiner* — Yemane Mesfin
*Assistant Examiner* — Peter Chen
(74) *Attorney, Agent, or Firm* — Sughrue Mion, PLLC

(57) ABSTRACT

A communication system that includes at least UE and an HLR that are used in an IMS network further includes: a Femto-cell base station that makes up a predetermined communication area, and a control unit for controlling at least communication between the UE and the HLR. The Femto-cell base station and the control unit are present between the UE and the HLR. The Femto-cell base station includes a transmission unit for transmitting messages received from the UE to the control unit and for transmitting messages received from the control unit to the UE. The control unit converts messages received from the Femto-cell base station to messages that can be recognized by the HLR, and converts messages received from the HLR to messages that can be recognized by the UE.

7 Claims, 14 Drawing Sheets

(56) References Cited

U.S. PATENT DOCUMENTS

| | | | |
|---|---|---|---|
| 2009/0067417 A1* | 3/2009 | Kalavade et al. | 370/356 |
| 2009/0156213 A1* | 6/2009 | Spinelli et al. | 455/436 |

FOREIGN PATENT DOCUMENTS

| | | | |
|---|---|---|---|
| JP | 2008-244751 A | 10/2008 | |
| JP | 2008-295045 A | 12/2008 | |
| JP | 2008295045 A | 12/2008 | |
| WO | 2006/138019 A3 | 12/2006 | |
| WO | 2006138019 A | 12/2006 | |
| WO | 2007015075 A | 2/2007 | |
| WO | 2007-015068 A1 | 2/2008 | |

OTHER PUBLICATIONS

Airvana, "Support for SIP-Based Femto Devices Overview, Architecture, and High Level Stage 2 Description," Feb. 18, 2008. CN Office Action. (doc 1 on p. 1 of translated CNOA for explanation of relevance.).

Yan Zhang et al., "Security Management in the Next Generation Wireless Networks," International Journal of Network Security, vol. 3, No. 1, Jul. 2006, pp. 1-7. CN Office Action. (doc 2 on p. 1 of translated CNOA for explanation of relevance.).

Chinese Office Action for CN Application No. 200980152921.7 issued on Jun. 5, 2013 with English Translation.

Office action in counterpart JP patent application, 2010-544056, dated Jan. 21, 2014.

* cited by examiner

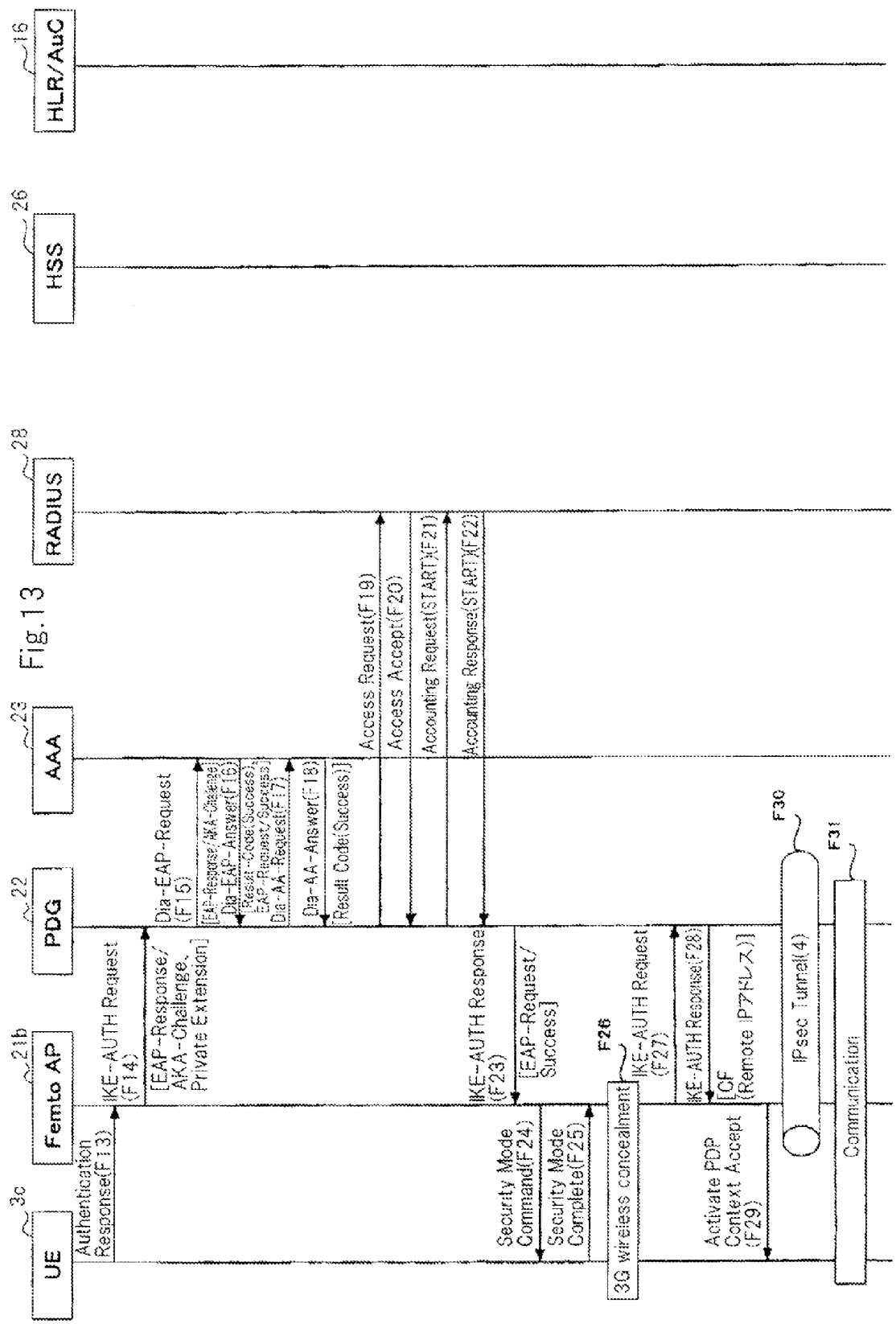

COMMUNICATION SYSTEM, FEMTO-CELL BASE STATION, AUTHENTICATION DEVICE, COMMUNICATION METHOD, AND MEMORY MEDIUM

TECHNICAL FIELD

The present invention relates to technology for implementing communication by using a femto-cell base station.

BACKGROUND ART

Recent years has seen advances in the development of communication systems that adopt femto-cell base stations that seek to achieve an improvement in quality of communication areas.

A femto-cell base station is a compact wireless base station that covers a limited communication area having a radius in the order of several tens of meters. A femto-cell base station is installed in a room such as a residence or office to cover an indoor communication area. The use of a femto-cell base station enables improvement of communication quality of communication areas that cannot be covered by existing macro-cell base stations. In addition, communication areas can be covered without adding costs for setting up the infrastructure of macro-cell base stations.

Existing 3G networks (communication systems) have been established between users and communication common carriers. "Existing 3G network" refers to a communication network that carries out communication via existing macro-cell base stations. As a result, constructing a new communication system by improving the existing 3G network for the purpose of introducing femto-cell base stations both results in high costs and places various burdens on the communication common carrier and users that use the existing 3G network.

As a result, rather than improve an existing 3G network, a new communication system must be built that can accept femto-cell base stations.

Literature exists that discloses technology for accessing IMS by way of WLAN/WWAN that takes into consideration related existing standard specifications (See Patent Document 1).

Literature exists that discloses certification technology for WLAN.

Patent Document 1: JP-A-2006-525762
Non-Patent Document 1: 3GPP TS 33.234 V8.0.0 (2007-12)

SUMMARY OF THE INVENTION

Problem to be Solved by the Invention

Patent Document 1 and Non-Patent Document 1 make no disclosure regarding a technology for introducing a femto-cell base station without improving an existing 3G network, and further, make no suggestion regarding this need.

It is an object of the present invention to solve the above-described problem by providing a communication system, a femto-cell base station, an authentication device, a communication method, and a memory medium that enable the introduction of a femto-cell base station without improving an existing 3G network (communication system).

Means for Solving the Problem

<Communication System>
The communication system according to the present invention is a communication system having at least UE (User Equipment) and an HLR (Home Location Register) that are used in an IMS (IP Multimedia subsystem), and that includes:
a femto-cell base station that makes up a predetermined communication area; and control means for controlling at least communication between the UE and the HLR; wherein:
the femto-cell base station and control means are present between the UE and the HLR; the femto-cell base station includes transmission control means for both transmitting messages received from the UE to the control means and for transmitting messages received from the control means to the UE; and
the control means converts messages received from the femto-cell base station to messages that can be recognized by the HLR, and converts messages received from the HLR to messages that can be recognized by the UE.

<Femto-Cell Base Station>
The femtocell base station according to the present invention is a femto-cell base station for accepting messages transmitted from UE, identifying a message that is accepted from the UE as a message corresponding to a location registration request of a CS (Circuit Switching) service, a message corresponding to a location registration request of a PS (Packet Switching) service, or a message corresponding to a PDP Activate, and transmitting to a relay device a message corresponding to the message that was identified.

<Authentication Device>
The authentication device according to the present invention is an authentication device for authenticating UE based on messages that a relay device accepts from a femto-cell base station and subscriber information managed by a management device; wherein the authentication device identifies a message accepted from the relay device as a message corresponding to a location registration request of PS service, a message corresponding to a location registration request of a CS service, or a message corresponding to a PDP Activate, and implements control according to the message that was identified.

<Communication Method>
The communication method according to the present invention is a communication method implemented by a communication system that includes: UE (User Equipment) and an HLR (Home Location Register) that are used in an IMS (IP Multimedia Subsystem) network, a femto-cell base station that makes up a predetermined communication area, and control means for controlling at least communication between the UE and the HLR, wherein the femto-cell base station and the control means are present between the UE and the HLR, the communication method including:
transmitting wherein the femto-cell base station transmits messages accepted from the UE to the control means;
transmitting wherein the femto-cell base station transmits messages accepted from the control means to the UE;
converting wherein the control means converts the messages accepted from the femto-cell base station to messages that can be recognized by the HLR; and
converting wherein the control means converts messages accepted from the HLR to messages that can be recognized by the UE.

In addition, the communication method according to the present invention is a communication method implemented by a femto-cell base station that accepts messages transmitted from UE, the communication method including:
identifying a message accepted from the UE as message that corresponds to a location registration request of a CS (Circuit Switching) service, a message corresponding to a location registration request of a PS (Packet switching) service, or a message corresponding to PDP Activate, and transmitting to a relay device a message corresponding to the message that was identified.

Still further, the communication method according to the present invention is a communication method carried out by an authentication device that performs authentication of UE based on messages that a relay device receives from a femto-cell base station and subscriber information that is managed in a management device; the communication method including: identifying a message received from the relay device as a message corresponding to a location registration request of a PS service, a message corresponding to a location registration request of a CS service, or a message corresponding to PDP Activate, and implementing control according to the message that was identified.

<Memory Medium>

The memory medium according to the present invention is a memory medium that can be read by a computer and on which is recorded a communication program that is to be executed by a femto-cell base station that receives messages transmitted from UE, the communication program causing the femto-cell base station to execute processes of identifying a message received from the UE as a message corresponding to a location registration request of a CS (Circuit Switching) service, a message corresponding to a location registration request of a PS (Packet Switching) service, or a message corresponding to PDP Activate, and transmitting to a relay device a message corresponding to the message that was identified.

In addition, the memory medium according to the present invention is a memory medium that can be read by a computer and on which is recorded a communication program for causing an authentication device to carry out authentication of UE based on messages received by a relay device from a femto-cell base station and subscriber information that is managed in a management device, the communication program causing the authentication device to execute processes of identifying a message received from the relay device as a message corresponding to a location registration request of a PS service, a message corresponding to a location registration request of a CS service, or a message corresponding to PDP Activate, and implementing control according to the message that was identified.

Effect of the Invention

According to the present invention, a femtocell base station can be introduced without improving an existing 3G network (communication system).

BRIEF DESCRIPTION OF THE DRAWINGS

FIG. 13 is an explanatory view of an example of the operation of the PS dispatch time IP sec establishment sequence (Activate PDP Context Request) process.

MODE FOR CARRYING OUT THE INVENTION (Summary of the Communication System)

Figure 1A:
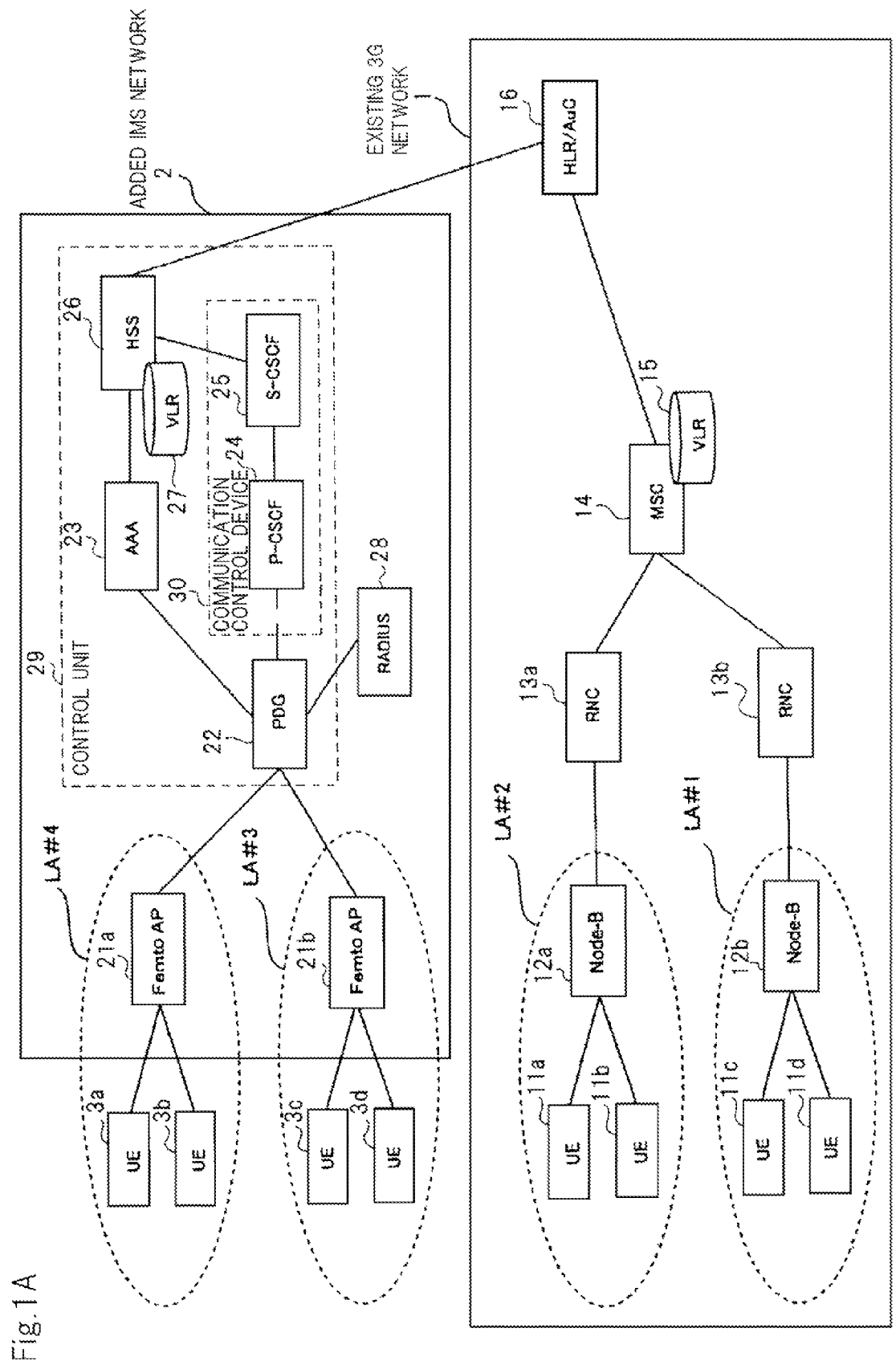
FIG. 1A is a block diagram showing a communication system according to the present exemplary embodiment.
Figure 1C:
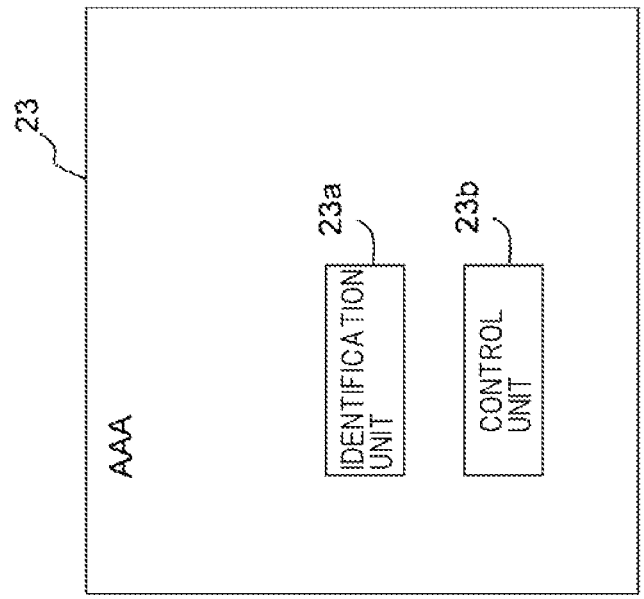
FIG. 1C is a block diagram showing an authentication device according to the present exemplary embodiment.
Figure 1B:
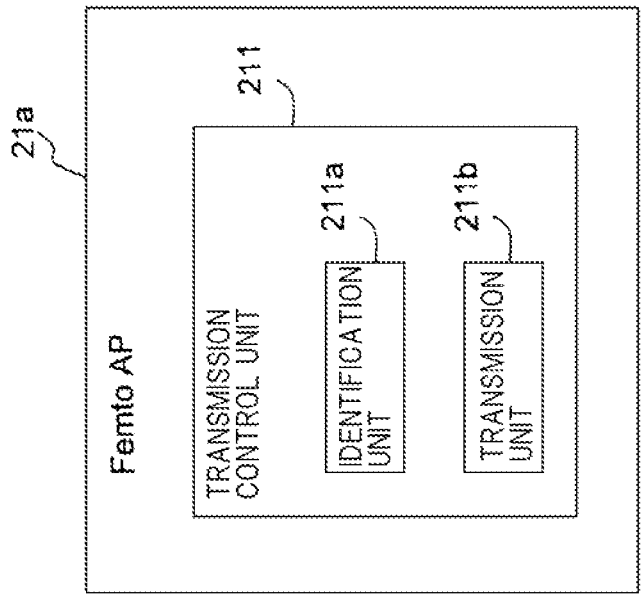
FIG. 1B is a block diagram showing a femtocell base station according to the present exemplary embodiment.

An outline of the communication system according to the present exemplary embodiment is next described while referring to FIGS. 1A-1C.

The communication system according to the exemplary embodiment includes: UE (User Equipment) 3a-3d and HLR (Home Location Register) 16 that are used in an IMS (IP Multimedia Subsystem), femtocell base stations (Femto AP (Femto Access Points)) 21a and 21b that make up predetermined communication areas, control unit [PDG 22 (Packet Data Gateway), AAA 23 (Authentication Authorization Accounting), HSS 26 (Home Subscriber Server), P-CSCF 24 (Proxy-Call Session Control Function), and S-CSCF 25 (Serving-Call Session Control Function)] 29 for controlling communication between UE 3a-3d and HLR 16 and communication between UE 3a-3d.

Control unit 29 can be generally called control means.

Femtocell base stations (Femto APs) 21a and 21b are of the same configuration. FIG. 1B is a block diagram showing femtocell base station (Femto AP) 21a.

Femtocell base stations (Femto AP) 21a and 21b according to the exemplary embodiment include transmission control unit 211 for transmitting messages received from any of UEs 3a to 3d to control unit 29 (PDG 22), or transmitting messages received from control unit 29 (PDG 22) to any of UEs 3a to 3d. Control unit 29 (PDG 22, AAA 23, HSS 26, P-CSCF 24, S-CSCF 25) converts messages received from femtocell base station (Femto AP) 21a or 21b to messages that can be recognized by HLR 16, or converts messages received from HLR 16 to messages that can be recognized by UE 3a-3d.

Transmission control unit 211 can typically be referred to as transmission control means. Transmission control unit 211 includes identification unit 211a and transmission unit 211b.

Identification unit 211a can typically be referred to as identification means. Identification unit 211a identifies whether a message received from UE 3a or 3b is a message corresponding to a location registration request of a CS (Circuit Switching) service, a message corresponding to a location registration request of a PS (Packet Switching) service, or a message corresponding to PDP Activate.

Transmission unit 211b can typically be referred to as transmission means. Transmission unit 211b transmits a message that corresponds to a message identified in identification unit 211a to PDG 22, which is a relay device.

According to the communication system according to the exemplary embodiment, a femtocell base station can be introduced without improving an existing 3G network (communication system). The following explanation regards the details of communication systems of the exemplary embodiment while referring to the accompanying drawings.

(Example of System Configuration of a Communication System)

The communication system according to the exemplary embodiment is first described while referring to FIGS. 1A-1C.

The communication system according to the exemplary embodiment includes existing 3G network 1 and added IMS (IP Multimedia subsystem) network 2.

Existing 3G network 1 is a known existing 3G network. Existing 3G network 1 includes: UE (User Equipment) 11a-11d, Nodes-B 12a and 12b, RNCs (Radio Network Controllers) 13a and 13b, MSC (Mobile Services Switching Center) 14, VLR (Visitor Location Register) 15, and HLR/AuC (Home Location Register/Authentication Center) 16. UE 11a-11d, Nodes-B 12a and 12b, RNCs 13a and 13b, MSC 14, VLR 15, and HLR/AuC 16 are devices for carrying out processes that conform to 3GPP. As a result, explanation is omitted regarding the actual processing operations of UE 11a-11d, Nodes-B 12a and 12b, RNCs 13a and 13b, MSC 14, VLR 15, and HLR/AuC 16.

Added IMS network 2 includes: Femto APs (Access Points) 21a and 21b, PDG (Packet Data Gateway) 22, AAA (Authentication Authorization Accounting) 23, P-CSCF (Proxy-Call Session Control Function) 24, S-CSCF (Serving-Call Session Control Function) 25, HSS (Home Subscriber Server) 26, VLR (Visitor Location Register) 27, and RADIUS (Remote Authentication Dial-in User Service) 28.

Femto APs 21a and 21b are compact wireless base stations that cover a small communication area having a radius in the order of several tens of meters.

PDG 22 is a relay device for relaying messages. PDG 22 receives, for example, a message received by Femto AP 21a from UE 3a. PDG 22 transmits messages received from, for example, Femto AP 21a to AAA 23.

P-CSCF 24 and S-CSCF 25 are included in communication control device 30. P-CSCF 24 and S-CSCF 25 are central nodes in the IMS network. P-CSCF 24 and S-CSCF 25 carry out functions such as session control, management, authentication, and routing that use SIP (Session Initiation Protocol). P-CSCF 24 performs control of SIP signals and security control between UE 3a-3d and P-CSCF 24. S-CSCF 25 performs control of SIP signals and service control to UE 3a-3d.

AAA 23 is an authentication device for carrying out authentication processing between UE 3a-3d and the network.

FIG. 1C is a block diagram showing AAA 23. AAA 23 includes identification unit 23a and control unit 23b.

Identification unit 23a can typically be referred to as identification means. Identification unit 23a identifies, for example, whether a message received from PDG is a message corresponding to a location registration request of a PS service, a message corresponding to a location registration request of a CS service, or a message corresponding to PDP Activate.

Control unit 23b can typically be referred to as control means. Control unit 23b carries out control according to messages identified in identification unit 23a.

HSS 26 is a management device for managing subscriber information of UE 3a-3d that are used in IMS.

VLR 27 stores the subscriber information of UE 3a-3d. HSS 26 acquires the subscriber information of UE 3a-3d from HLR/AuC 16. HSS 26 stores the subscriber information of UE 3a-3d in VLR 27 and manages the subscriber information of UE 3a-3d. In addition, HSS 26 has the function of converting the format of the VLR-formatted subscriber data to an IMS-formatted subscriber data format.

AAA 23 carries out authentication of UE 3a based on, for example, messages from UE 3a that PDG 22 received from Femto AP 21a and subscriber information managed by HSS 26.

Communication control device 30 controls communication by means of SIP of Femto AP 21a when authentication of UE 3a is successful in AAA 23.

RADIUS 28 carries out the authentication process of UE 3a-3d.

(Processing Operations of Communication System)

The processing operations of the communication system of the exemplary embodiment are next described in detail.

(CS Location Update (IMSI)/Attach)

Figure 2:
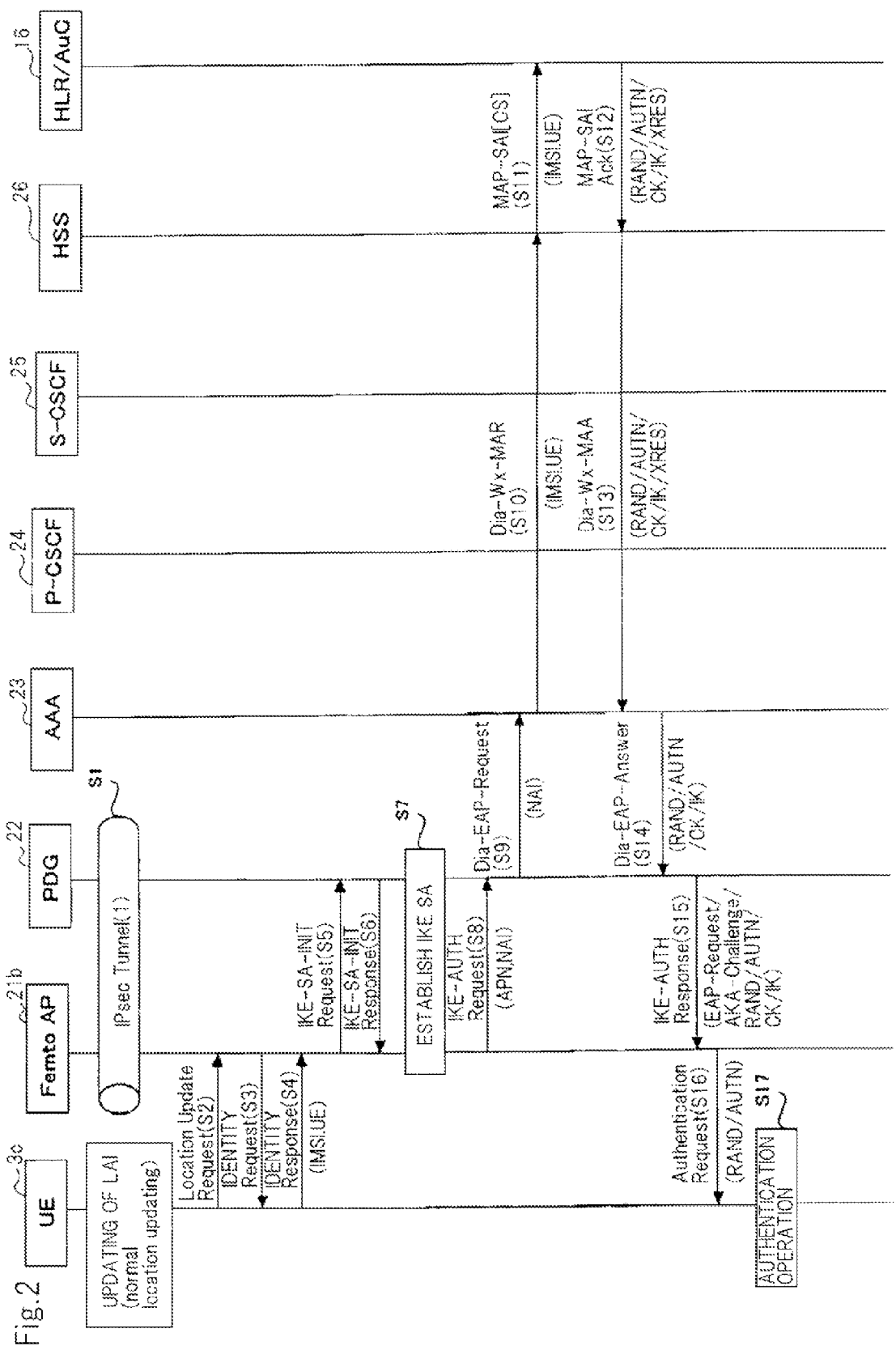
FIG. 2 is an explanatory view of an example of the operation (Authentication OK) of the "CS Location Update (IMSI)/Attach" process.
Figure 3:
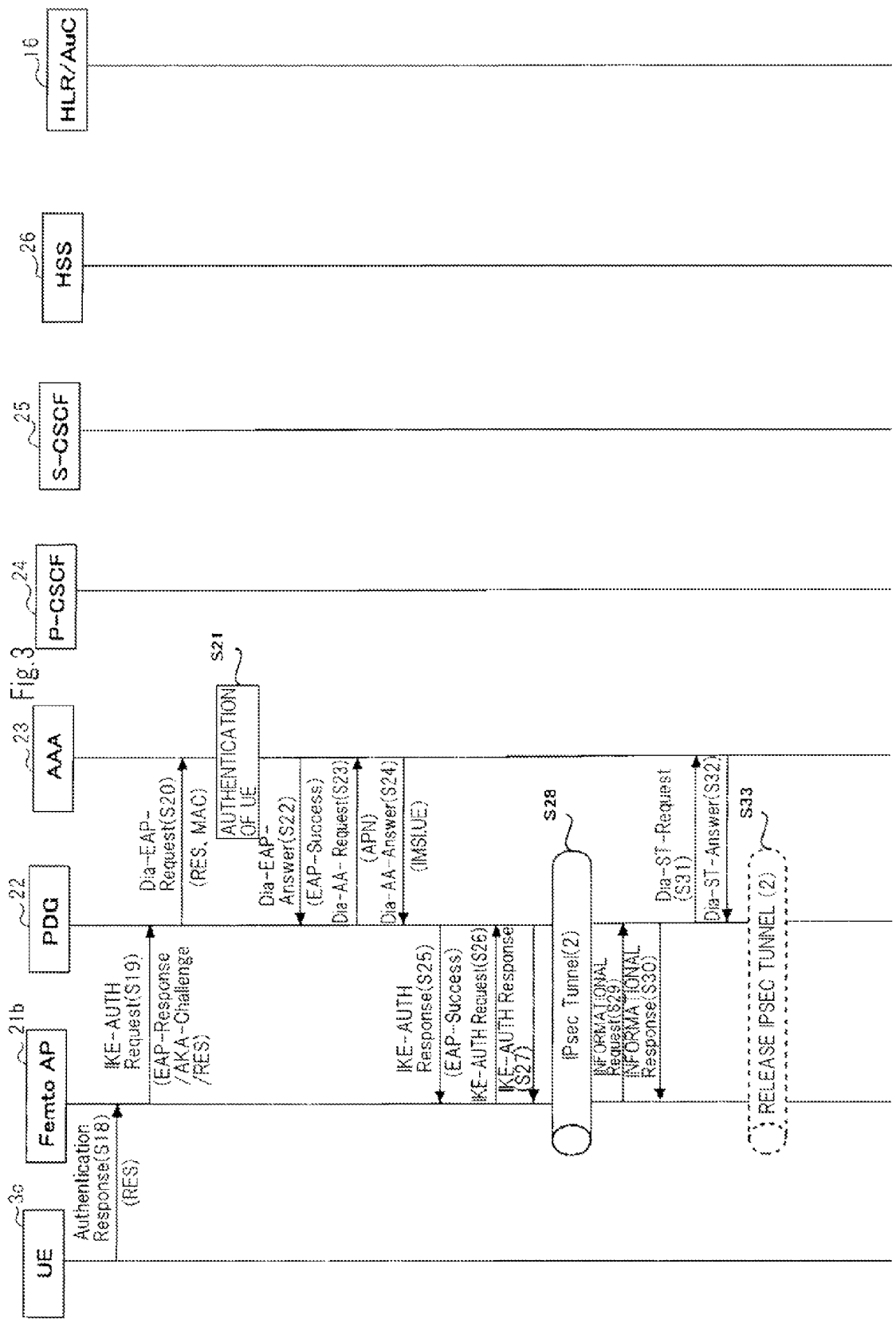
FIG. 3 is an explanatory view of an example of the operation (Authentication OK) of the "CS Location Update (IMSI)/Attach" process.
Figure 4:
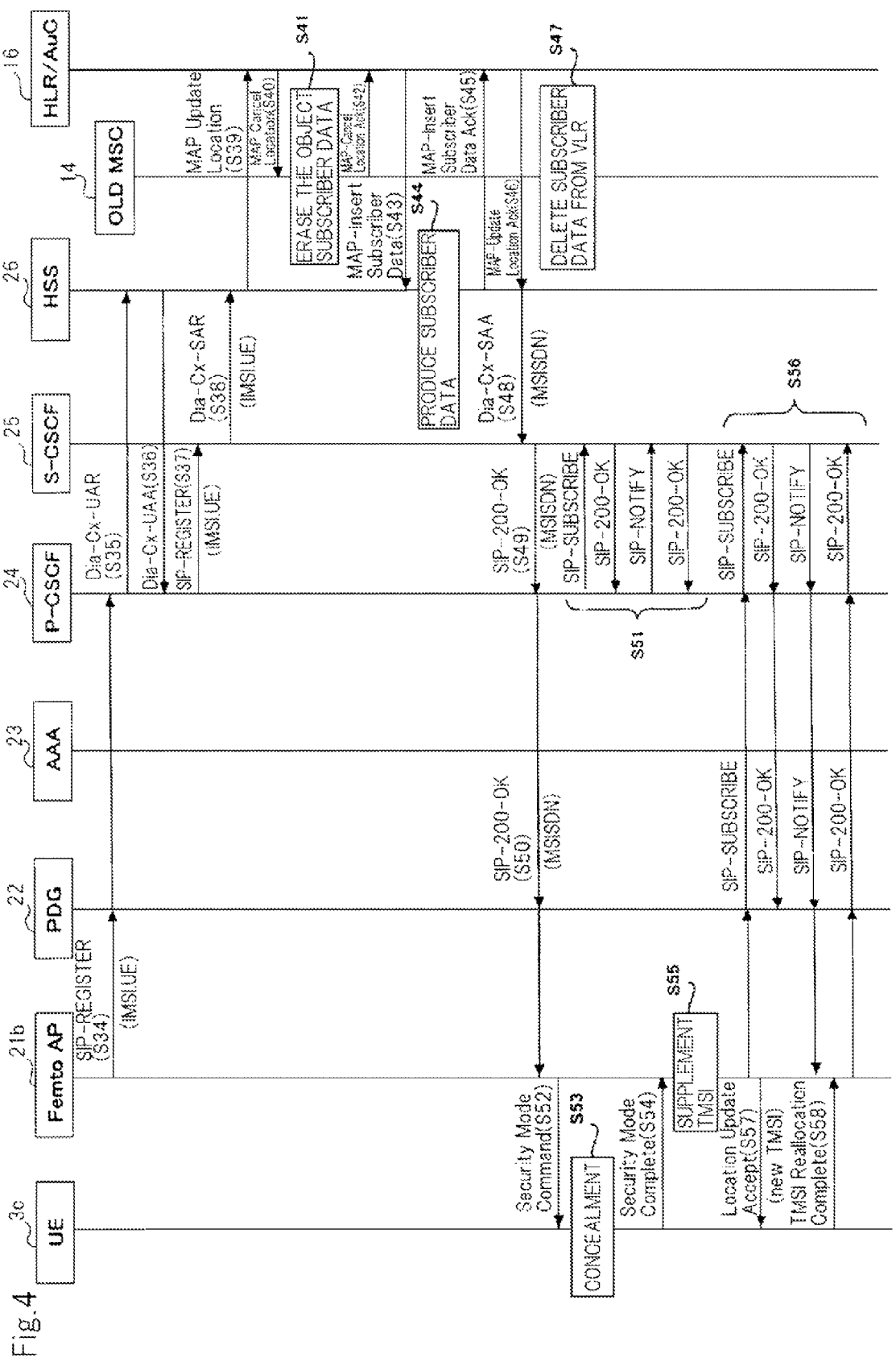
FIG. 4 is an explanatory view of an example of the operation (Authentication OK) of the "CS Location Update (IMSI)/Attach" process.

The processing operations for CS (Circuit Switching) Location Update (IMSI)/Attach are next described while referring to FIGS. 2-4.

When UE 3c, after having registered location in MSC 14 in existing 3G network 1, moves into LA (Location Area) #3 under the jurisdiction of Femto AP 21b in added IMS network 2, UE 3c begins location registration of the CS service (initial location registration). MSC 14 in existing 3G network 1 where UE 3c last registered location is taken as "OLD MSC." Explanation next regards the processing operations when UE 3c moves to LA#3 that is under the jurisdiction of Femto AP 21b. In the following explanation, it is assumed that IP sec Tunnel (1) has been established between Femto AP 21b and PDG 22 (Step S1).

UE 3c transmits a Location Update Request to Femto AP 21b to carry out updating (normal location updating) of the LAI (Location Area Information) (Step S2).

Femto AP 21b, upon receiving the Location Update Request, transmits an IDENTITY Request to UE 3a (Step S3).

Upon receiving the IDENTITY Request, UE 3a transmits an IDENTITY Response that includes IMSI.UE to Femto AP 21b (Step S4). IMSI.UE is information for identifying UE 3a.

Upon receiving the IDENTITY Response, Femto AP 21b transmits an IKE-SA-INIT Request to PDG 22 (Step S5). IKE-SA-INIT is "Internet Key Exchange-Security Authentication-INITialize".

PDG 22, having received the IKE-SA-INIT Request, transmits IKE-SA-INIT Response to Femto AP 21b (Step S6).

Upon receiving the IKE-SA-INIT Response, Femto AP 21b establishes IKE SA between Femto AP 21b and PDG 22 (Step S7).

Femto AP 21b next transmits to PDG 22 an IKE-AUTH. Request that contains both an APN (Access Point Name) and an NAI (Network Access Identifier) (Step S8). IKE-AUTH is Internet Key Exchange-AUTHentication. APN is information for identifying the linking point of the network. NAI is information for identifying access of the network.

The explanation of the operations from Step S1 to Step S8 is here supplemented. Femto AP 21b has received a Location Update Request from UE 3c, and therefore determines that the message (Location Update Request) received from UE 3c is a message corresponding to a request to register the location of a CS service (CS service location registration request). Having been requested to register the location of the CS service, Femto AP 21b transmits an IKE-AUTH request that includes a NAI indicating "0CS0<UE_IMSI>/<Femto_IMSI>@realmname" to PDG 22. "0CS0" is information indicating the CS service location registration. "<UE_IMSI>" is information for identifying the UE and is IMSI.UE in the IDENTITY Response that was received in Step S4. "<Femto_IMSI>" is information for identifying the Femto AP.

Upon receiving the IKE-AUTH request, PDG 22 transmits to AAA 23 a Dia-EAP-Request that includes the NAI in the IKE-AUTH Request (Step S9). Dia-EAP is Diameter-Extensible Authentication Protocol.

AAA 23, having received the Dia-EAP-Request, determines based on NAI in the Dia-EAP-Request whether the Dia-EAP-Request (the message received from PDG 22) is a CS service location registration request (a message corresponding to a request for location registration of the CS service), a PS service location registration request (a message corresponding to a request for location registration of the PS service), or a PDP Activate request (a message corresponding to PDP Activate). When AAA 23 determines that the Dia-EAP-Request is a CS service location registration request, AAA 23 transmits to HSS 26 the Dia-Wx-MAR that includes IMSI.UE indicated in the NAI in the Dia-EAP-Request (Step S10). Dia-Wx-MAR is a Diameter-Wx-Multimedia Authentication Request.

To supplement explanation of the operation of Step S10, AAA 23 determines that the Dia-EAP-Request is a CS service location registration request because NAI indicates "0CS0<UE_IMSI>/<FemtoIMSI>@realmname."

Upon receiving Dia-Wx-MAR, HSS 26 transmits MAP-SAI [CS] that includes IMSI.UE in Dia-Wx-MAR to HLR/AuC 16 (Step S11). MAP-SAI is MAP-Send Authentication Information. [CS] indicates "Circuit Switching."

HLR/AuC 16, having received MAP-SAI [CS], acquires RAND/AUTN/CK/IK/XRES corresponding to IMSI.UE in MAP-SAI[CS], and transmits to HSS 26 MAP-SAI Ack that includes this RAND/AUTN/CK/IK/XRES (Step S12).

RAND/AUTN/CK/IK/XRES is information that conforms to 3GPP. RAND is "Random challenge." AUTN is "Authentication Token." CK is "Cipher Key." IK is "Integrity Key." XRES is "Expected RESponse."

In these processing operations, HLR/AuC 16 transmits MAP-SAI Ack that includes RAND/AUTN/CK/IK/XRES (EAP-AKA authentication). However, there are cases in which HLR/AuC 16 transmits MAP-SAI Ack that includes RAND/AUTN/KC/RES (EAP-SIM authentication). HLR/AuC 16 selects either EAP-AKA authentication (UMTS authentication) or EAP-SIM authentication (GSM authentication) according to the capacity of the NW with which UE 3c is contracted.

Upon receiving MAP-SAI Ack, HSS 26 transmits to AAA 23 Dia-Wx-MAA that includes RAND/AUTN/CK/IK/XRES in MAP-SAI Ack (Step S13). Dia-Wx-MAA is a "Diameter-Wx-Multimedia Authentication Answer."

Upon receiving Dia-Wx-MAA, AAA 23 transmits to PDG 22 a Dia-EAP-Answer that includes RAND/AUTN/CK/IK in Dia-Wx-MAA (Step S14).

PDG 22, having received the Dia-EAP-Answer, transmits to Femto AP 21b an IKE-AUTH Response that contains both an EAP-Request/AKA-Challenge and RAND/AUTN/CK/IK in the Dia-EAP-Answer (Step S15). AKA is "Authentication and Key Agreement."

Femto AP 21b, upon receiving the IKE-AUTH Response, transmits to UE 3c an Authentication Request that includes RAND/AUTN in the IKE-AUTH response (Step S16).

Upon receiving the Authentication Request, UE 3c carries out the authentication operation based on RAND/AUTN in the Authentication Request (Step S17). The authentication operation is carried out by a method that conforms with 3GPP.

UE 3c calculates RES and transmits to Femto AP 21b an Authentication Response that contains this RES (Step S18). The calculation of RES is carried out by a method that conforms with 3GPP.

Upon receiving the Authentication Response, Femto AP 21b transmits to PDG 22 an IKE-AUTH Request that contains both EAP-Response/AKA-Challenge and the RES in the Authentication Response (Step S19).

Upon receiving the IKE-AUTH Request, PDG 22 calculates MAC (Message Authentication Code) and transmits to AAA 23 a Dia-EAP-Request that contains both the RES and MAC (Step S20). The calculation of MAC is carried out by a method that conforms with 3GPP.

AAA 23, having received the Dia-EAP-Request, carries out authentication of the UE (Step S21). The authentication of the UE is carried out by a method that conforms with 3GPP.

When authentication of the UE is successful, AAA 23 transmits a Dia-EAP-Answer that contains EAP-Success to PDG 22 (Step S22).

Upon receiving the Dia-EAP-Answer, PDG 22 transmits a Dia-AA-Request that contains APN to AAA 23 (Step S23).

AAA 23, having received the Dia-AA-Request, transmits a Dia-AA-Answer that contains IMSI.UE to PDG 22 (Step S24).

Upon receiving the Dia-AA-Answer, PDG 22 transmits an IKE-AUTH Response that contains EAP-Success to Femto AP 21b (Step S25).

Femto AP 21b, upon receiving the IKE-AUTH Response, transmits an IKE-AUTH Request to PDG 22 (Step S26).

Upon receiving the IKE-AUTH Request, PDG 22 transmits an IKE-AUTH Response to Femto AP 21b (Step S27).

Upon receiving the IKE-AUTH Response, Femto AP 21b establishes the IPsec Tunnel (2) between Femto AP 21b and PDG 22.

Femto AP 21b next transmits an INFORMATIONAL Request to PDG 22 (Step S29).

Upon receiving the INFORMATIONAL Request, PDG 22 transmits an INFORMATIONAL Response to Femto AP 21b (Step S30).

PDG 22 further transmits a Dia-ST-Request to AAA 23 (Step S31).

Upon receiving the Dia-ST-Request, AAA 23 transmits a Dia-ST-Answer to PDG 22 (Step S32).

PDG 22, upon receiving the Dia-ST-Answer, releases the IPsec Tunnel (2) that was established in Step S28 (Step S33).

In the exemplary embodiment, the process of UE authentication is carried out in the state in which the IPsec Tunnel (1) is established between Femto AP 21b and PDG 22 in Step S1. After completion of UE authentication, there is no need to establish the IPsec Tunnel (2) between Femto AP 21b and PDG 22 that was established in Step S28. The processes of Step S29-Step S32 are therefore carried out, and the IPsec Tunnel (2) that was established in Step S28 is released. As a result, the unnecessary IPsec Tunnel (2) can be released, and efficient utilization of resources can be achieved.

Femto AP 21b next transmits a SIP-REGISTER that includes IMSI.UE to P-CSCF 24 (Step S34).

Upon receiving the SIP-REGISTER, P-CSCF 24 transmits a Dia-Cx-UAR to HSS 26 (Step S35).

Upon receiving the Dia-Cx-UAR, HSS 26 transmits a Dia-Cx-UAA to P-CSCF 24 (Step S36).

P-CSCF 24, having received the Dia-Cx-UAA, transmits a SIP-REGISTER that contains IMSI.UE to S-CSCF 25 (Step S37).

Upon receiving the SIP-REGISTER, S-CSCF 25 transmits a Dia-Cx-SAR that contains IMSI.UE to HSS 26 (Step S38).

HSS 26, having received the Dia-Cx-SAR, transmits the MAP Update Location that includes IMSI.UE to HLR/AuC 16 (Step S39).

Upon receiving the MAP Update Location, HLR/AuC 16 transmits a MAP Cancel Location that includes IMSI.UE to OLD MSC (MSC 14) (Step S40).

OLD MSC (MSC 14), having received the MAP Cancel Location, erases the object subscriber data (Step S41).

OLD MSC (MSC 14) next transmits a MAP Cancel Location Ack to HLR/AuC 16 (Step S42).

HLR/AuC 16, upon receiving the MAP Cancel Location Ack, transmits MAP-Insert Subscriber Data to HSS 26 (Step S43). The MAP-Insert Subscriber Data contains subscriber information of IMSI.UE.

Upon receiving the MAP-Insert Subscriber. Data, HSS 26 produces subscriber data based on the subscriber information of IMSI.UE in the MAP-Insert Subscriber Data (Step S44). HSS 26 registers the subscriber data in VLR 27 and manages the subscriber data. In addition, HSS 26 has the function of converting the format of the VLR-format subscriber data to the format of IMS-format subscriber data.

HSS 26 next transmits a MAP-Insert Subscriber Data Ack to HLR/AuC 16 (Step S45).

Upon receiving the MAP-Insert Subscriber Data Ack, HLR/AuC 16 transmits a MAP-Update Location Ack to HSS 26 (Step S46).

OLD MSC (MSC 14), after erasing object subscriber data in Step S41, deletes the subscriber data from VLR 15 in which the erased subscriber data is registered (Step S47).

Upon receiving the MAP-Update Location Ack, HSS 26 transmits a Dia-Cx-SAA that includes MSISDN to S-CSCF 25 (Step S48).

S-CSCF 25, having received the Dia-Cx-SAA, transmits an SIP-200 OK that includes MSISDN to P-CSCF 24 (Step S49).

Upon receiving the SIP-200 OK, P-CSCF 24 transmits the SIP-200 OK that includes MSISDN to Femto AP 21b (Step S50).

P-CSCF 24 further transmits messages to and receives messages from S-CSCF 25 and carries out a verification process (Step S51/SIP-SUBSCRIBE, SIP-200 OK, SIP-NOTIFY, SIP-200 OK).

Femto AP 21b, upon receiving the SIP-200 OK, transmits a Security Mode Command to UE 3c (Step S52).

Upon receiving the Security Mode Command, UE 3c carries out concealment (Step S53). The concealment process is carried out by a method that conforms with 3GPP.

UE 3c transmits a Security Mode Complete to Femto AP 21b (Step S54).

Upon receiving the Security Mode Complete, Femto AP 21b supplements TMSI (Temporary Mobile Subscriber Identities) (Step S55). The supplementation of TMSI is carried out by a method that conforms with 3GPP.

Femto AP 21b transmits messages to and receives messages from S-CSCF 25 by way of P-CSCF 24 and carries out verification processes (Step S56/SIP-SUBSCRIBE, SIP-200 OK, SIP-NOTIFY, SIP-200 OK).

Femto AP 21b further transmits a Location Update Accept that includes new TMSI to UE 3c (Step S57).

UE 3c, upon receiving the Location Update Accept, transmits a TMSI Reallocation Complete to Femto AP 21b (Step S58).

Thus, in the communication system of the exemplary embodiment, messages are transmitted and received among UE 3c, Femto AP 21b, PDG 22, AAA 23, HSS 26, and HLR/AuC 16 in a state in which the IPsec Tunnel (I) is established between Femto AP 21b and PDG 22 (Step S1), authentication processes of UE 3c are carried out, and when the authentication of UE 3c is successful, the IPsec Tunnel (2) is established between Femto AP 21b and PDG 22 (Steps S2-S28). The IPsec Tunnel (2) between Femto AP 21b and PDG 22 that was established by the authentication process of UE 3c is then released (Steps S29-S33). Messages are subsequently transmitted and received among Femto AP 21b, PDG 22, P-CSCF 24, S-CSCF 25, HSS 26, OLD MSC (MSC 14), and HLR/AuC 16; subscriber data of UE 3a that is managed by VLR 15 of OLD MSC (MSC 14) is moved to HSS 26; and the subscriber data of UE 3c is registered in VLR 27 of HSS 26 (Steps S34-S44). In this way, the authentication process of UE 3c can be carried out by way of Femto AP 21b when registering the location of a CS service and the subscriber data of UE 3c can be registered in VLR 27 of HSS 26.

(Authentication NG (No Subscriber Information))

Figure 5:
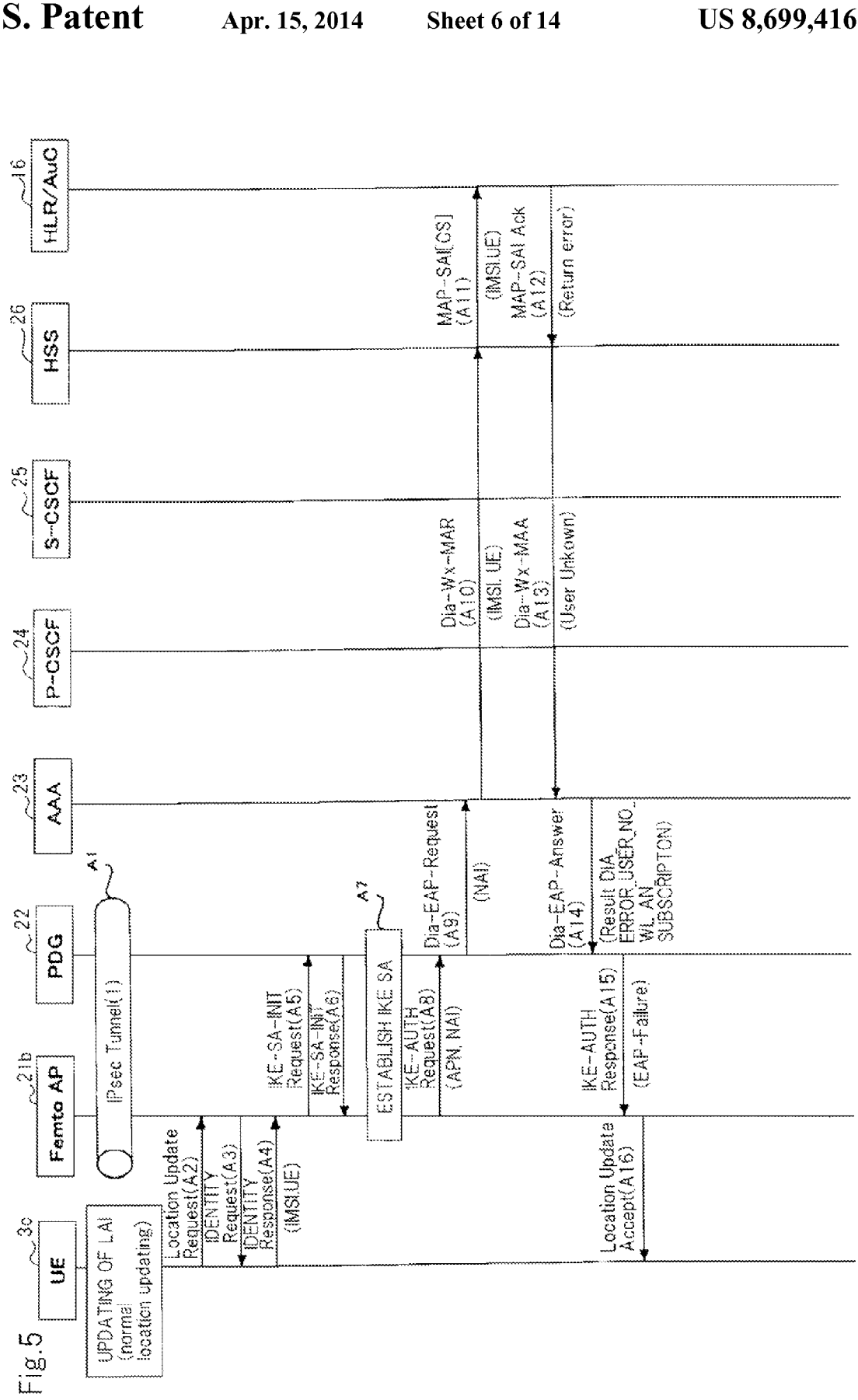
FIG. 5 is an explanatory view of an example of the operation (Authentication NG) of the "CS Location Update (IMSI)/Attach" process.

Processing operations are next described for a case of Authentication NG (No Subscriber Information) with reference to FIG. 5. It is further assumed in the process of FIG. 5 that IPsec Tunnel (1) has already been established between Femto AP 21b and PDG 22 (Step A1).

UE 3c transmits to Femto AP 21b a Location Update Request to carry out LAI updating (Normal Location Updating) (Step A2).

Upon receiving the Location Update Request, Femto AP 21b transmits an IDENTITY Request to UE 3c (Step A3).

UE 3c, having received the IDENTITY Request, transmits to Femto AP 21b an IDENTITY Response that includes IMSI.UE to identify UE 3c (Step A4).

Upon receiving the IDENTITY Response, Femto AP 21b transmits an IKE-SA-INIT Request to PDG 22 (Step A5).

PDG 22, having received the IKE-SA-INIT Request, transmits an IKE-SA-INIT Response to Femto AP 21b (Step A6).

When Femto AP 21b receives the IKE-SA-INIT response, Femto AP 21b establishes IKE SA between Femto AP 21b and PDG 22 (Step A7).

Femto AP 21b next transmits to PDG 22 an IKE-AUTH Request that includes an APN (Access Point Name) and a NAI (Network Access Identifier) (Step A8).

The explanation of the processing operations from Step A1 to Step A8 is here supplemented. Because Femto AP 21b has received a Location Update Request from UE 3c, Femto AP 21b determines that the message (Location Update Request) received from UE 3c is a message that corresponds to a request for location registration of a CS service (CS service location registration request). When a location registration of a CS service is requested, Femto AP 21b transmits an IKE-AUTH request including a NAI that indicates "1CS0<UE_IMSI>/<Femto_IMSI>@realmname" to PDG 22. "<UE_IMSI>" is information for identifying UE 3c and is IMSI.UE in the IDENTITY Response received in Step A4. "<Femto_IMSI>" is information for identifying the Femto AP.

Upon receiving the IKE-AUTH Request, PDG 22 transmits to AAA 23 a Dia-EAP-Request that includes the NAI in the IKE-AUTH Request (Step A9).

AAA 23, having received the Dia-EAP-Request, determines based on the NAI in the Dia-EAP-Request whether the Dia-EAP-Request (the message received from PDG 22) is a CS service location registration request (a message corresponding to a request for location registration of a CS service), a PS service location registration request (a message corresponding to a request for location registration of a PS service), or a PDP Activate request (a message corresponding to PDP Activate). Upon determining that the Dia-EAP-Request is a CS service location registration request, AAA 23 transmits to HSS 26 a Dia-Wx-MAR that contains IMSI.UE indicated by the NAI in the Dia-EAP-Request (Step A10).

To supplement the explanation of the operation of Step A10, AAA 23 determines that the Dia-EAP-Request is a CS service location registration request because the NAI indicates "0CS0<UE_IMSI>/<Femto_IMSI>@realmname."

Upon receiving the Dia-Wx-MAR, HSS 26 transmits a MAP-SAI[CS] to HLR/AuC 16 (Step A11).

Upon receiving the MAP-SAI[CS], HLR/AuC 16 transmits a MAP-SAI Ack to HSS 26 (Step A12). In the present operation, the authentication is NG (no subscriber information), and HLR/AuC 16 therefore transmits a MAP-SAI Ack that includes the information "Return error" (Step A12).

The following cases can be considered when HLR/AuC 16 transmits the information "Return error" (when authentication is NG):

A case in which subscriber information is not registered (User Unknown);

A case in which data received from HSS 26 is abnormal or in which necessary information is missing; and A case in which HLR/AuC 16 was unable to implement processing correctly due to some abnormality.

HSS 26, upon receiving the MAP-SAI Ack, transmits to AAA 23 a Dia-Wx-MAA that includes "User Unknown" because the information "Return error" is included in the MAP-SAI Ack (Step A13).

Upon receiving the Dia-Wx-MAA, AAA 23 transmits to PDG 22 a Dia-EAP-Answer that includes: "Result:DIA_ERROR_USER_NO_WLAN_SUBSCRIPTION" because "User Unknown" is included in the Dia-Wx-MAA (Step A14).

PDG 22, having received the Dia-EAP-Answer, transmits to Femto AP 21b an IKE-AUTH. Response that includes EAP-Failure because "Result:DIA_ERROR_USER_NO_WLAN_SUBSCRIPTION" is included in the Dia-EAP-Answer (Step A15).

Upon receiving the IKE-AUTH Response, Femto AP 21b transmits a Location Update Accept to UE 3c (Step A16).

Thus, in the communication system of the exemplary embodiment, messages are transmitted and received among UE 3c, Femto AP 21b, PDG 22, AAA 23, HSS 26, and HLR/AuC 16 in a state in which an IPsec Tunnel (1) is established between Femto AP 21b and PDG 22 (Step A1), and authentication processing of UE is carried out. Upon determining that authentication of UE 3c has failed, Femto AP 21b transmits a Location Update Accept to UE 3c (Step A16) and terminates the authentication process of UE 3c.

(Location Update Request (Periodic) Between UE and Femto AP)

Figure 6:
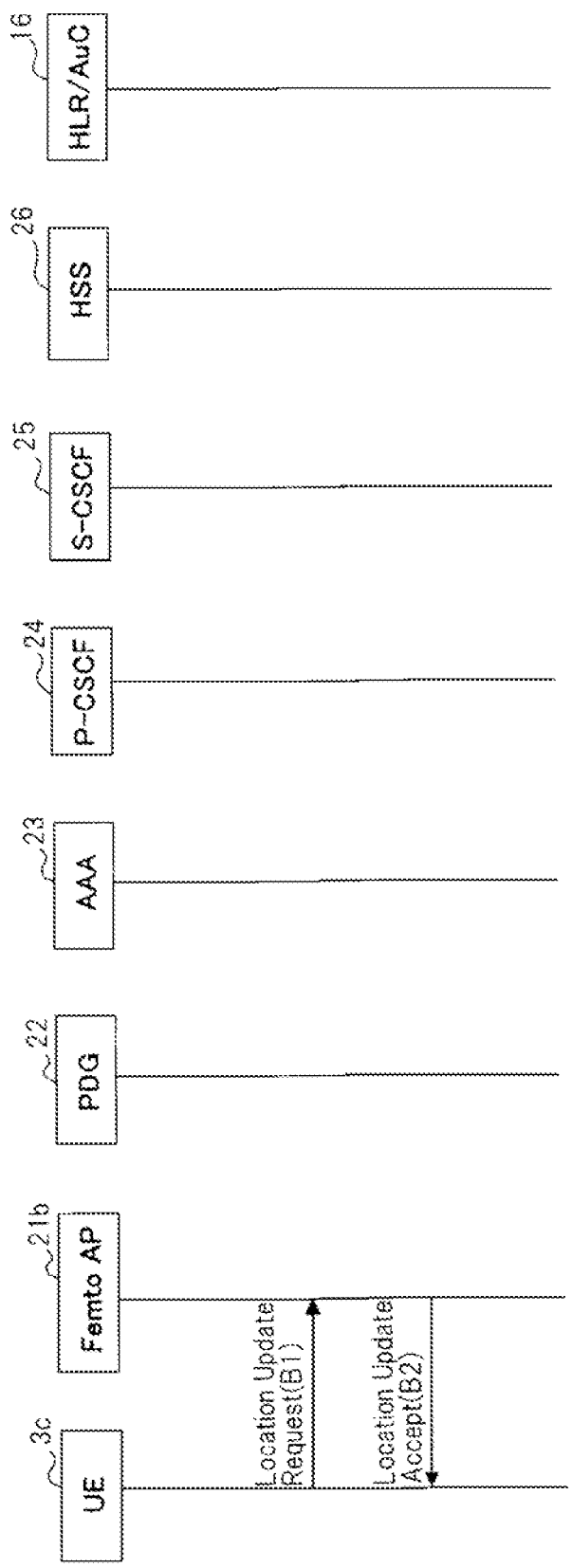
FIG. 6 is an explanatory view of an example of the processing operations when carrying out a Location Update between UE and femto AP.

Explanation next regards the implementation of a Location Update between UE 3c and Femto AP 21b while referring to FIG. 6. The Location Update is carried out asynchronously.

UE 3c transmits a Location Update Request to Femto AP 21b (Step B1).

Upon receiving the Location Update Request, Femto AP 21b transmits a Location Update Accept to UE 3c (Step B2).

In this way, the Location Update is carried out between UE 3c and Femto AP 21b.

(Location Update Request (Periodic) Between Femto AP and IMS)

Figure 7:
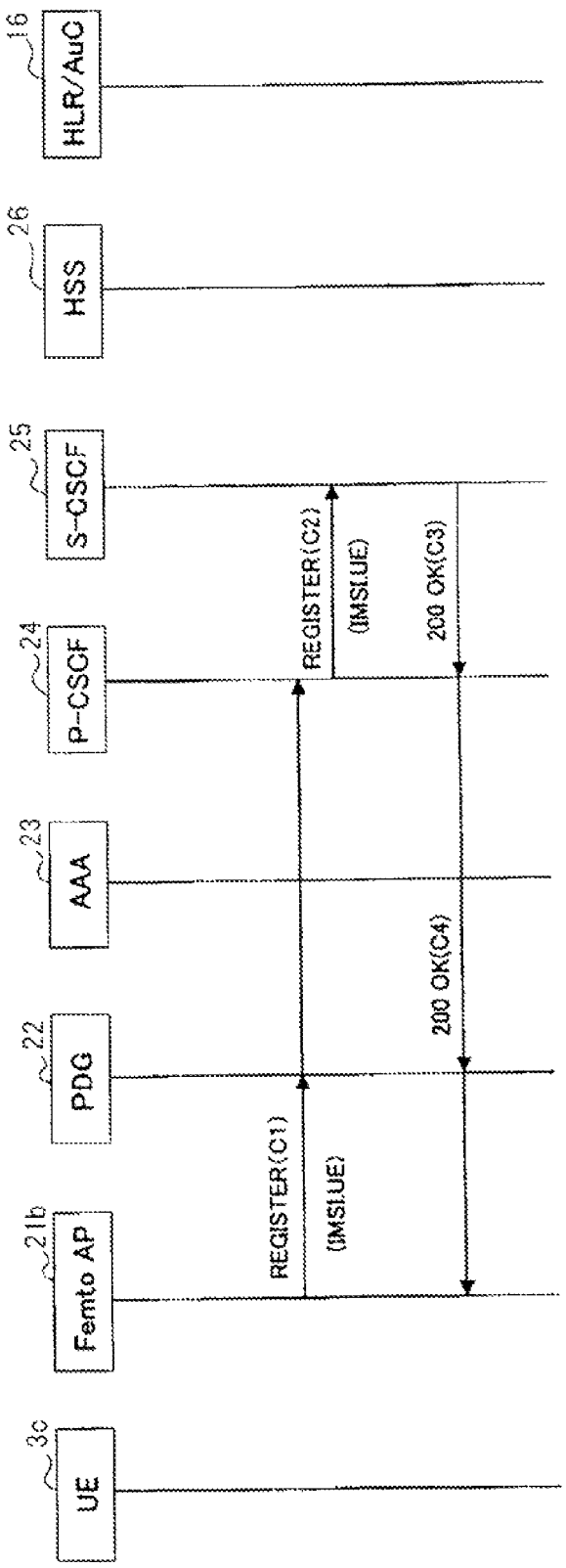
FIG. 7 is an explanatory view of an example of the processing operations when carrying out Location Update between a Femto AP and IMS.

Explanation next regards the implementation of a Location Update between Femto AP 21b and IMS while referring to FIG. 7. The Location Update is carried out asynchronously.

Femto AP 21b transmits a REGISTER that includes IMSI.UE to P-CSCF 24 asynchronously (Step C1).

Upon receiving the REGISTER, P-CSCF 24 transmits the REGISTER that includes IMSI.UE to S-CSCF 25 (Step C2).

S-CSCF 25, upon receiving the REGISTER, transmits 200 OK to P-CSCF 24 (Step C3).

P-CSCF 24, upon receiving 200 OK, transmits 200 OK to Femto AP 21b (Step C4).

The Location Update is thus carried out between Femto AP 21b and IMS.

(PS Routing Update (IMSI)/Attach)

Figure 8:
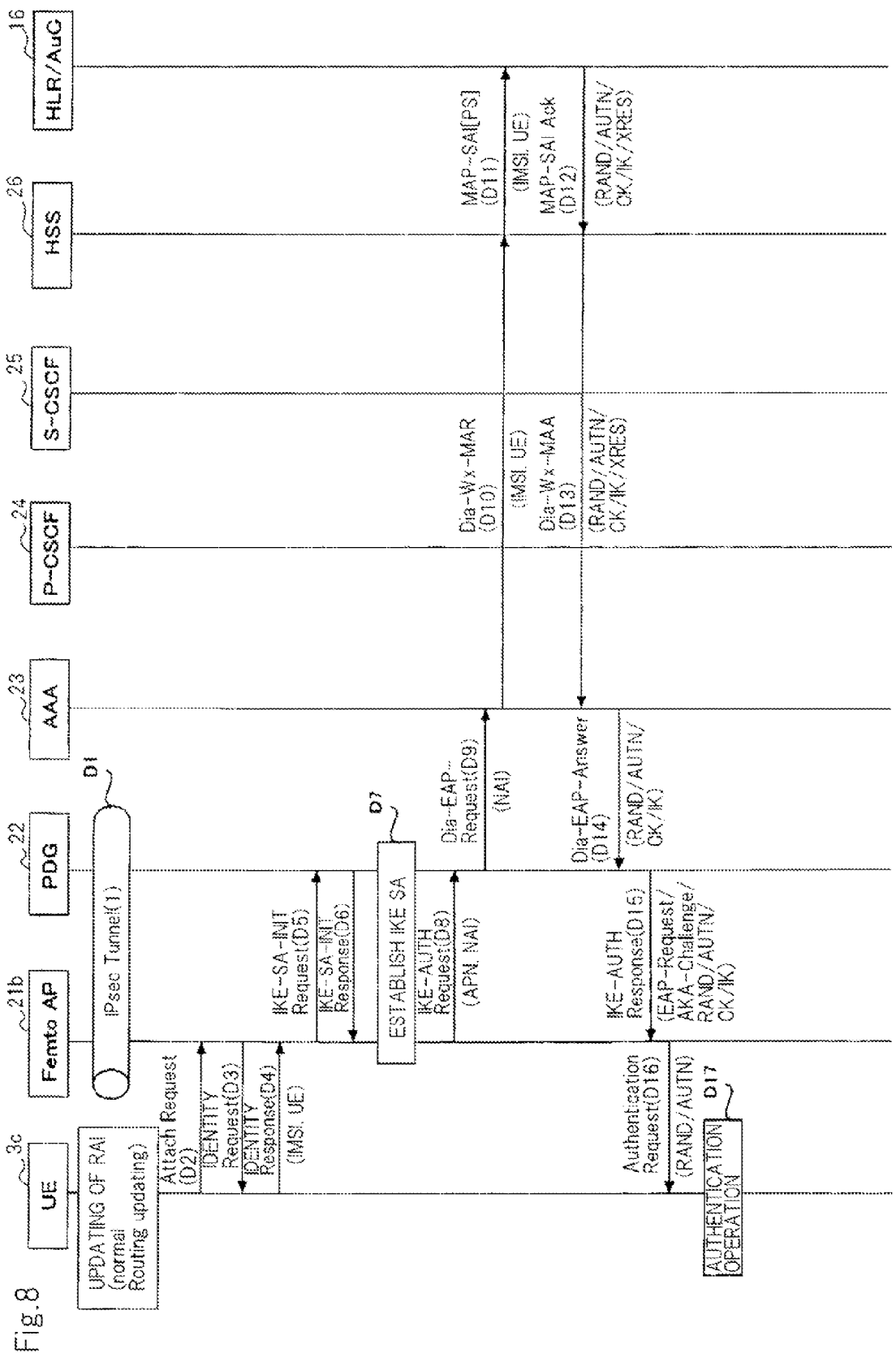
FIG. 8 is an explanatory view of an example of the processing operations of the "PS Routing Update (IMSI)/Attach" process.
Figure 9:
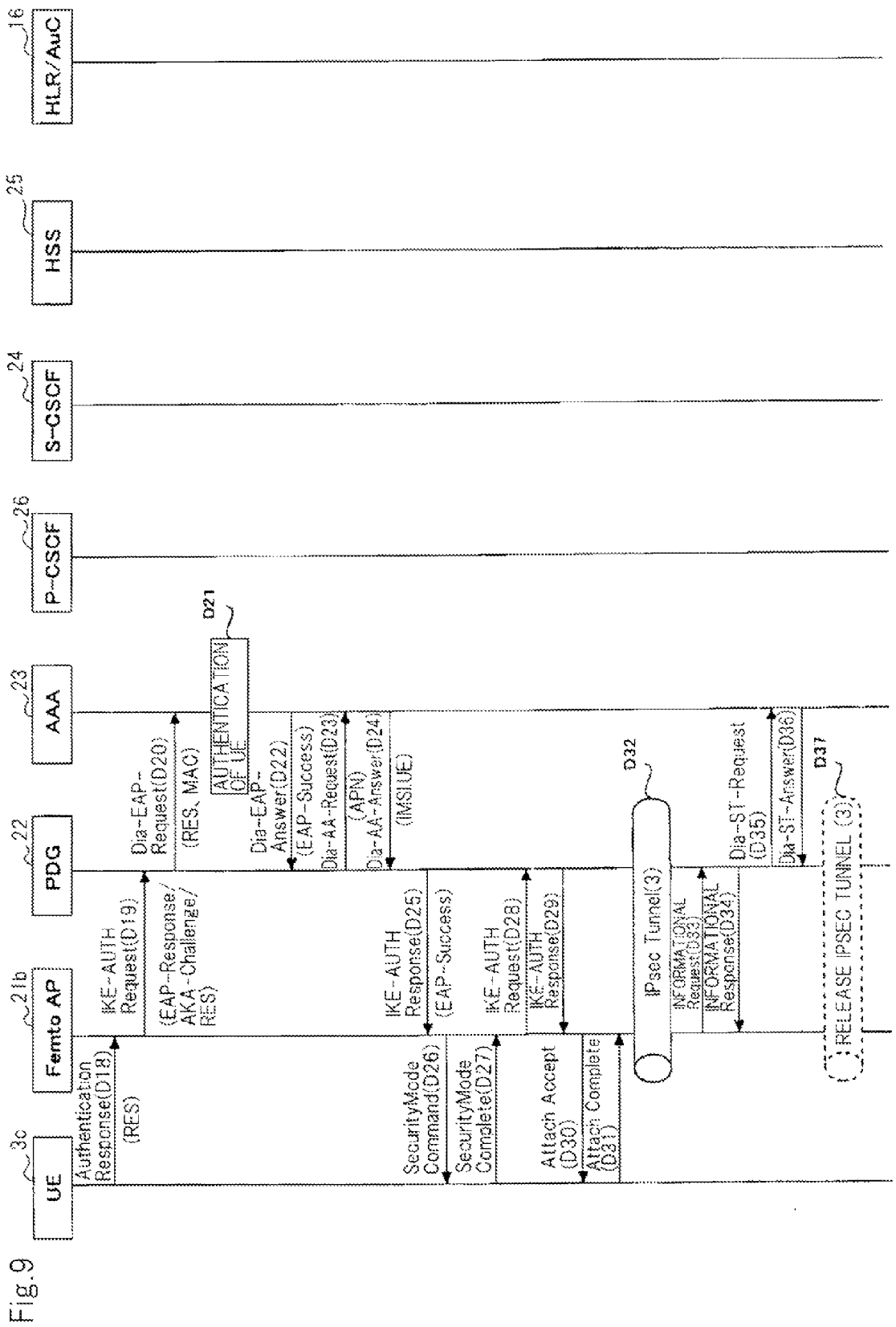
FIG. 9 is an explanatory view of an example of the operations of the "PS Routing Update (IMSI)/Attach" process.

Explanation first regards processing operations of a PS (Packet Switching) Routing Update (IMSI)/Attach while referring to FIGS. 8 and 9.

When UE 3c moves into an RA (Routing Area) that is under the jurisdiction of Femto AP 21b, UE 3c begins a PS service location registration (Initial Location Registration). The following explanation regards the processing operations when UE 3c is moving into the RA (Routing Area) that is under the jurisdiction of Femto AP 21b. In the following explanation, it is assumed that the IPsec Tunnel (1) is already established between Femto AP 21b and PDG 22 (Step D1).

UE 3c transmits to Femto AP 21b an Attach Request to implement updating (normal routing updating) of the RAI (Routing Area Information) (Step D2).

Upon receiving the Attach Request, Femto AP 21b transmits an IDENTITY Request to UE 3c (Step D3).

Upon receiving the IDENTITY Request, UE 3c transmits an IDENTITY Response that includes IMSI.UE to Femto AP 21b (Step D4). IMSI.UE is information for identifying UE 3c.

Upon receiving the IDENTITY Response, Femto AP 21b transmits an IKE-SA-INET Request to PDG 22 (Step D5). IKE SA is then established between Femto AP 21b and PDG 22 (Steps D6 and D7)

Femto AP 21b next transmits to PDG 22 an IKE-AUTH Request that includes both an APN (Access Point Name) and a NAI (Network Access Identifier) (Step D8).

The explanation of the operations from Step D1 to Step D8 is here supplemented. Femto AP 21b has received an Attach Request from UE 3c, and therefore determines that the message received from UE 3c (Attach Request) is a message corresponding to a CS service location registration request (request for location registration of a PS service). When a request is made for PS service location registration, Femto AP 21b transmits to PDG 22 an IKE-AUTH Request containing a NAI that indicates: "0PS0<UE_IMSI>/<Femto_IMSI>@realmname." "0PS0" is information signifying that this is a PS service location registration. "<UE_IMSI>" is information for identifying UE 3c and is IMSI.UE that was contained in the IDENTITY Response received in Step D4. "<Femto_IMSI>" is information for identifying the Femto AP.

Upon receiving the IKE-AUTH Request, PDG 22 transmits to AAA 23 a Dia-EAP-Request that includes the NAI in the IKE-AUTH Request (Step D9).

Upon receiving the Dia-EAP-Request, AAA 23 determines based on the NAI in the Dia-EAP-Request whether the Dia-EAP-Request (the message received from PDG 22) is a CS service location registration request (a message corresponding to a request for location registration of a CS service), a PS service location registration request (a message corresponding to a request for location registration of a PS service), or a PDP Activate Request (a message corresponding to PDP Activate). AAA 23 determines that the Dia-EAP-Request is a PS service location registration request and then transmits to HSS 26 a Dia-Wx-MAR that includes IMSI.UE indicated by the NAI in the Dia-EAP-Request (Step D10).

The explanation of the operation of Step D10 is here supplemented. AAA 23 determines that the Dia-EAP-Request is a PS service location registration request because the NAI indicates: "0PS0<UE_IMSI>/<Femto_IMSI>@realmname."

HSS 26, upon receiving the Dia-Wx-MAR, transmits to HLR/AuC 16 a MAP-SAI[PS] that includes IMSI.UE in the Dia-Wx-MAR (Step D11). [PS] signifies "Packet Switching."

Upon receiving the MAP-SAI[PS], HLR/AuC 16 acquires RAND/AUTN/CK/IK/XRES that corresponds to IMSI.UE in the MAP-SAI[PS] and transmits to HSS 26 a MAP-SAI Ack that includes this RAND/AUTN/CK/IK/XRES (Step D12).

The processing of Step D13 to Step D25 is equivalent to the processing of Step S13 to Step S25.

Upon receiving the IKE-AUTH Response, Femto AP 21b transmits a Security Mode Command to UE 3c (Step D26).

UE 3c, having received the Security Mode Command, transmits a Security Mode Complete to Femto AP 21b (Step D27).

Femto AP 21b, having received the Security Mode Complete, transmits an IKE-AUTH Request to PDG 22 (Step D28).

Upon receiving the IKE-AUTH Request, PDG 22 transmits an IKE-AUTH Response to Femto AP 21b (Step D29).

Upon receiving the IKE-AUTH Response, Femto AP 21b transmits an Attach Accept to UE 3c (Step D30).

Upon receiving the Attach Accept, UE 3c transmits an Attach Complete to Femto AP 21b (Step D31).

Upon receiving the Attach Complete, Femto AP 21b establishes an IPsec Tunnel (3) between Femto AP 21b and PDG 22 (Step D32).

Processing from Step D33 to Step D37 is equivalent to processing from Step S29 to Step S33, and the IPsec Tunnel (3) that was established in Step D32 is released (Step D37).

Thus, in the communication system of the exemplary embodiment, messages are transmitted and received among UE 3a, Femto AP 21b, PDG 22, AAA 23, HSS 26, and HLR/AuC 16 in a state in which an IPsec Tunnel (1) is established between Femto AP 21b and PDG 22 (Step D1) and the authentication process of UE 3c is carried out. When authentication of UE 3c is successful, the IPsec Tunnel (3) is established between Femto AP 21b and PDG 22 (Steps D2-D32). The IPsec Tunnel (3) that was established between Femto AP 21b and PDG 22 by the authentication process of UE 3c is then released (Steps S33-D37). In this way, the authentication process of UE 3a can be carried out by way of Femto AP 21b at the time of the location registration of PS service.

(RA Update Request (Macro→Femto AP))

Figure 10:
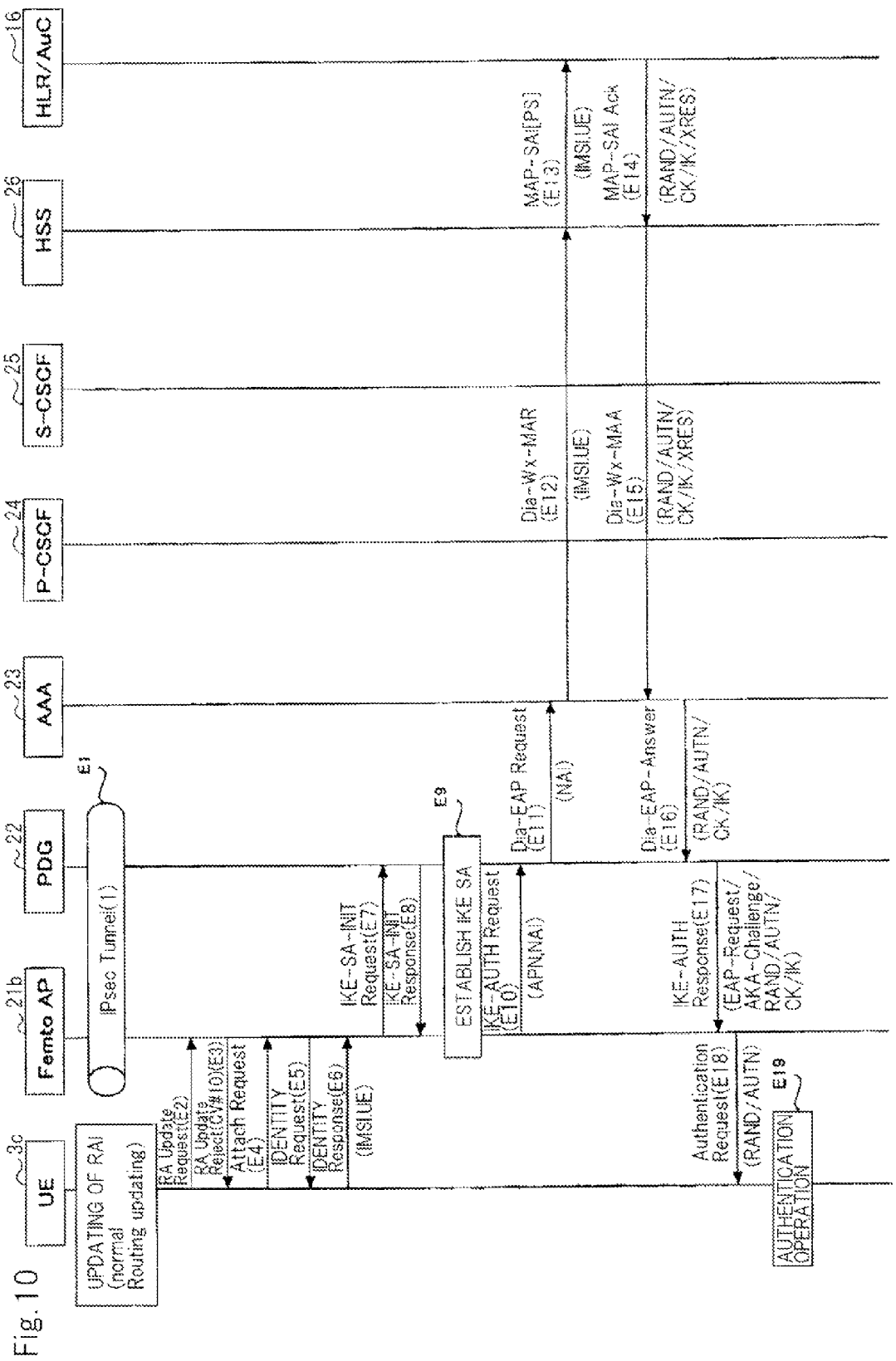
FIG. 10 is an explanatory view of an example of the operations of the "PS Routing Update (IMSI)/Attach" process.
Figure 11:
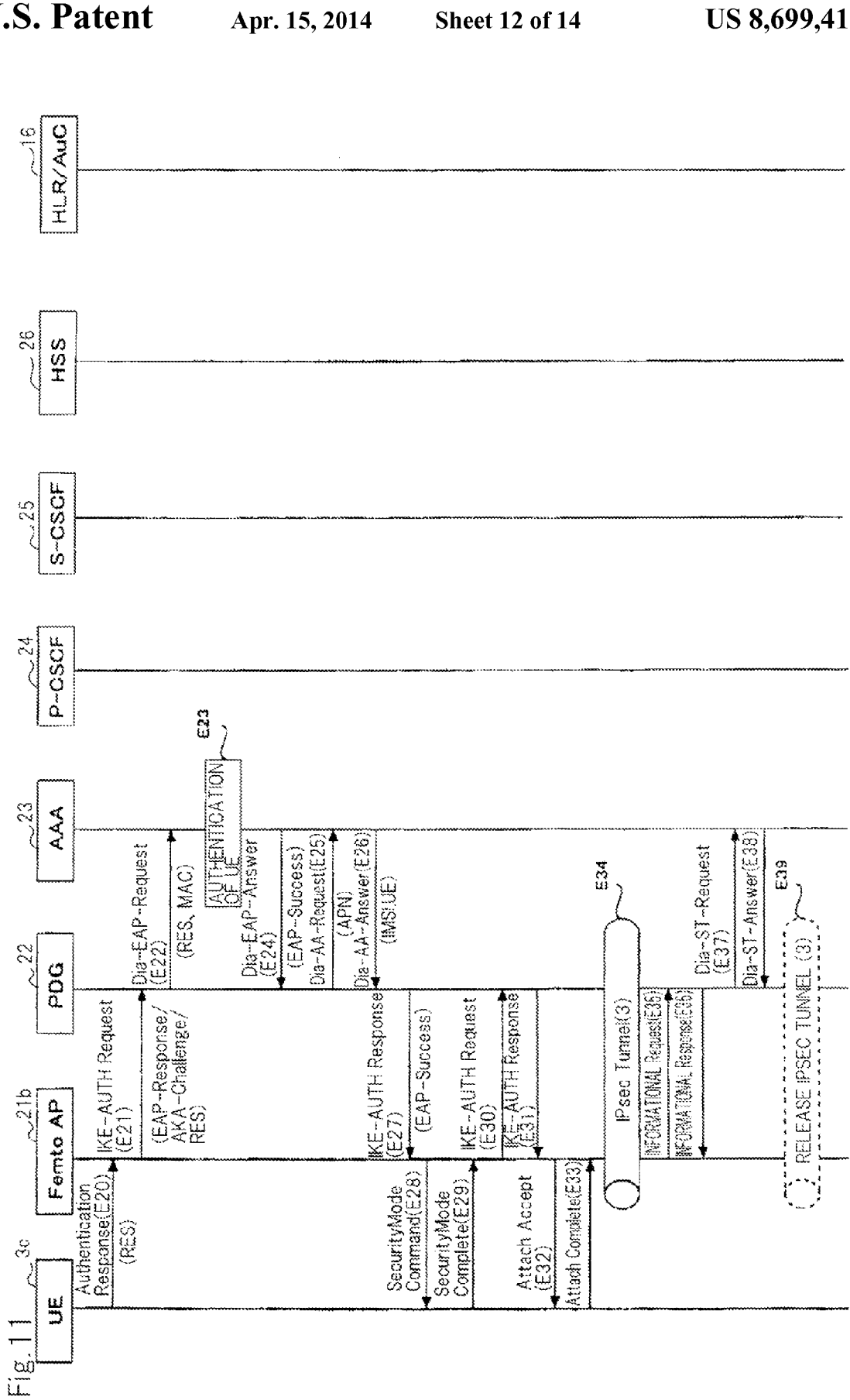
FIG. 11 is an explanatory view of an example of the operations of the "PS Routing Update (IMSI)/Attach" process.

Explanation next regards processing operations when UE 3c implements an RA Update Request when UE 3c has moved from existing 3G network 1 on the macro side to added IMS network 2 that is under the jurisdiction of Femto AP 21b while referring to FIGS. 10 and 11. A macro-side PDP is overwritten when UE 3c moves from added IMS network 2 to existing 3G network 1.

UE 3c transmits to Femto AP 21b an RA Update Request for implementing updating (normal routing updating) of RAI (Routing Area Information) (Step E2).

Upon receiving the RA Update Request, Femto AP 21b transmits to UE 3c an RA Update Reject that includes CV#10 because RAI is macro-side information (Step E3).

Upon receiving the RA Update Reject, UE 3c transmits an Attach Request to Femto AP 21b (Step E4).

The processing from Step E5 to Step E39 is equivalent to processing from Step D2 to Step D37.

Thus, when RAI is macro-side information, Femto AP 21b carries out an Attach Request to UE 3c and carries out the same processes as described in FIGS. 8 and 9.

(Periodic RA Update Request)

The implementation of a Periodic RA Update Request is next described.

Femto AP 21b, upon receiving a Periodic RA Update Request from UE 3c, transmits an RA Update Accept to UE 3c. The Periodic RA Update Request is thus carried out.

(IPsec Establishment Sequence upon PS Call Origination)

Figure 12:
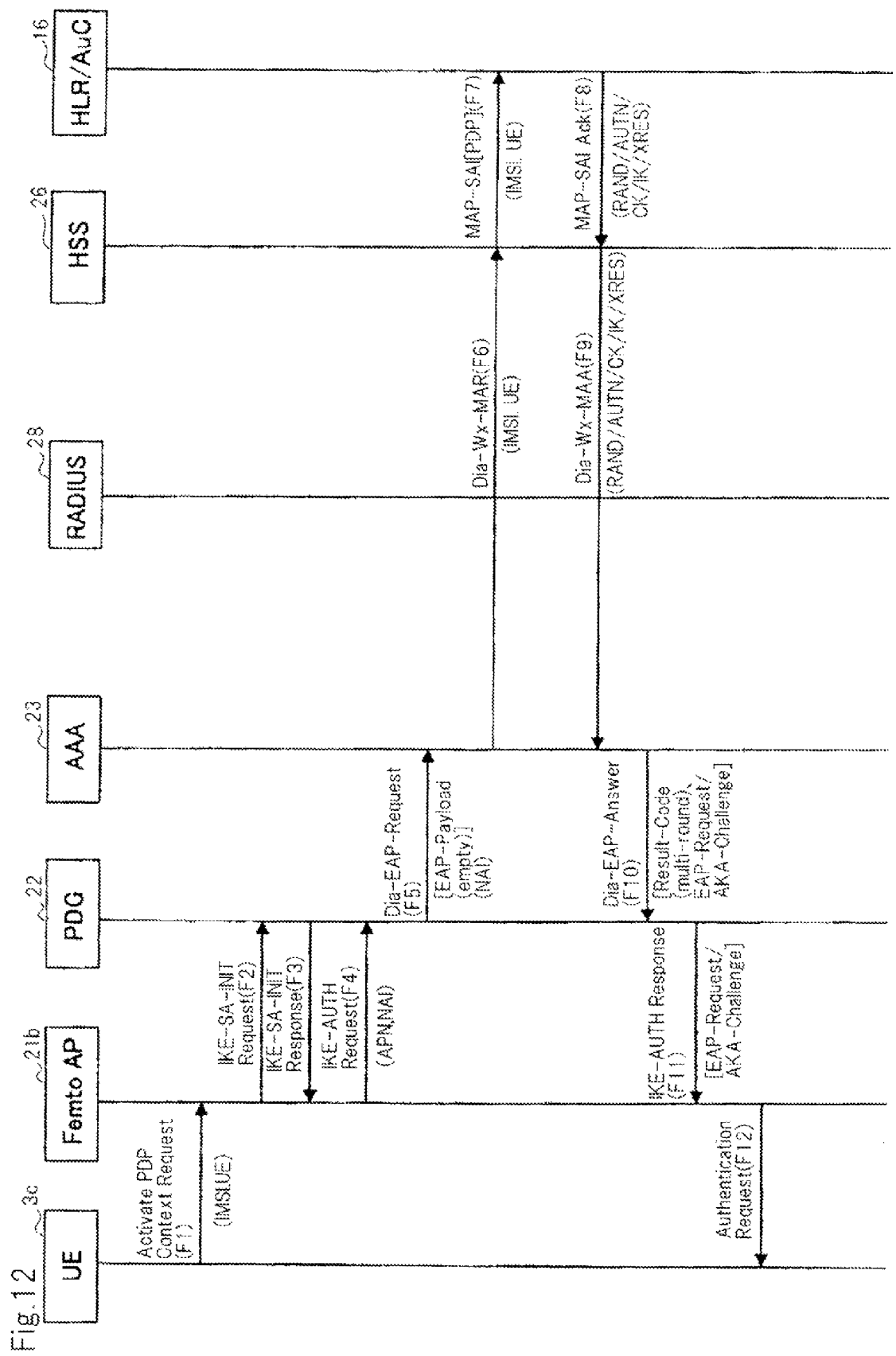
FIG. 12 is an explanatory view of an example of the operations of the PS dispatch time IP sec establishment sequence (Activate PDP Context Request) process.

The processing operations of the IPsec establishment sequence upon PS call origination (Activate PDP Context Request) are next described while referring to FIGS. 12 and 13.

UE 3c transmits an Activate PDP Context Request that includes IMSI.UE to Femto AP 21b (Step F1).

Upon receiving the Activate PDP Context Request, Femto AP 21b transmits an IKE-SA-INIT Request to PDG 22 (Step F2).

Upon receiving the IKE-SA-INIT Request, PDG 22 transmits an IKE-SA-INIT Response to Femto AP 21b (Step F3).

Femto AP 21b, having received the IKE-SA-KNIT Response, transmits to PDG 22 an IKE-AUTH Request that includes both an APN (Access Point Name) and a NAI (Network Access Identifier) (Step F4).

Explanation of the operations from Step F1 to Step F4 is here supplemented. Femto AP 21b has received an Activate PDP Context Request from UE 3c and therefore determines that the message received from UE 3c (Activate PDP Context Request) is a message corresponding to a PDP Activate (PDP Activate). When requested for a PDP Activate, Femto AP 21b transmits to PDG 22 an IKE-AUTH Request that contains a NAI that indicates "0PDP0<UE_IMSI>/<Femto_IMSI>@realmname." "0PDP0" is information indicating a PDP Activate. "<UE_IMSI>" is information for identifying UE 3c and is IMSI.UE in the Activate PDP Context Request that was received in Step F1. "<Femto_IMSI>" is information for identifying the Femto AP.

Upon receiving the IKE-AUTH Request, PDG 22 transmits to AAA 23 a Dia-EAP-Request that includes both the NAI in the IKE-AUTH Request and EAP-Payload (empty) (Step F5).

Upon receiving the Dia-EAP-Request, AAA 23 determines based on the NAI in the Dia-EAP-Request whether the Dia-EAP-Request (the message received from PDG 22) is a CS service location registration request (a message corresponding to a request to register the location of the CS service), a PS service location registration request (a message corresponding to a request to register the location of the PS service), or a PDP activate request (a message corresponding to PDP Activate). When AAA 23 determines that the Dia-EAP-Request is a PDP Activate request, AAA 23 transmits to HSS 26 a Dia-Wx-MAR that includes IMSI.UE indicated by the NAI in the Dia-EAP-Request (Step F6).

The explanation of the operation of Step F6 is here supplemented. AAA 23 determines that the Dia-EAP-Request is a PDP Activate Request because the NAI indicates: "0PDP0<UE_IMSI>/<Femto_IMSI>@realmname."

Upon receiving the Dia-Wx-MAR, HSS 26 transmits a MAP-SAI[PDP] that includes IMSI.UE in the Dia-Wx-MAR to HLR/AuC 16 (Step F7). [PDP] means "PDP Activate."

Upon receiving the MAP-SAI[PDP], HLR/AuC 16 acquires RAND/AUTN/CK/IK/XRES that corresponds to IMSI.UE in the MAP-SAI[PDP] and transmits to HSS 26 a MAP-SAI Ack that includes this RAND/AUTN/CK/IK/XRES (Step F8).

HSS 26, upon receiving the MAP-SAI Ack, transmits to AAA 23 a Dia-Wx-MAA that includes RAND/AUTN/CK/IK/XRES in the MAP-SAI Ack (Step F9).

Upon receiving the Dia-Wx-MAA, AAA 23 transmits to PDG 22 a Dia-EAP-Answer that includes both Result-Code (multi-round) and an EAP-Request/AKA-Challenge (Step F10).

After receiving the Dia-EAP-Answer, PDG 22 transmits to Femto AP 21*b* an IKE-AUTH Response that includes an EAP-Request/AKA-Challenge (Step F11).

Upon receiving the IKE-AUTH Response, Femto AP 21*b* transmits an Authentication Request to UE 3*c* (Step F12).

UE 3*c*, having received the Authentication Request, transmits an Authentication Response to Femto AP 21*b* (Step F13).

Upon receiving the Authentication Response, Femto AP 21*b* transmits to PDG 22 an IKE-AUTH Request that includes both an EAP-Response/AKA-Challenge and a Private Extension (Step F14).

Upon receiving the IKE-AUTH Request, PDG 22 transmits a Dia-EAP-Request that includes the EAP-Response/AKA-Challenge to AAA 23 (Step F15).

AAA 23, having received the Dia-EAP-Request, transmits to PDG 22 a Dia-EAP-Answer that includes both Result-Code (Success) and an EAP-Request/Success (Step F16).

PDG 22, having received the Dia-EAP-Answer, transmits a Dia-AA-Request to AAA 23 (Step F17).

Upon receiving the Dia-AA-Request, AAA 23 transmits to PDG 22 a Dia-AA-Answer that includes Result-Code (Success) (Step F18).

Upon receiving the Dia-AA-Answer, PDG 22 transmits an Access Request to RADIUS 28 (Step F19).

Upon receiving the Access Request, RADIUS 28 transmits an Access Accept to PDG 22 (Step F20).

Upon receiving the Access Accept, PDG 22 transmits an Accounting Request (START) to RADIUS 28 (Step F21).

RADIUS 28, having received the Accounting Request (START), transmits an Accounting Response (START) to PDG 22 (Step F22).

Upon receiving the Accounting Response (START), PDG 22 transmits an IKE-AUTH Response that includes EAP-Request/Success to Femto AP 21*b* (Step F23).

Upon receiving the IKE-AUTH Response, Femto AP 21*b* transmits a Security Mode Command to UE 3*c* (Step F24).

UE 3*c*, having received the Security Mode Command, transmits Security Mode Complete to Femto AP 21*b* (Step F25).

Femto AP 21*b*, having received the Security Mode Complete, carries out a 3G wireless concealment process (Step F26) and transmits an IKE-AUTH Request to PDG 22 (Step F27). The 3G wireless concealment process is carried out by a method that conforms with 3GPP.

Upon receiving the IKE-AUTH Request, PDG 22 transmits an IKE-AUTH Response that includes CF (Remote IP Address) to Femto AP 21*b* (Step F28).

CF (Remote IP Address) is an IP address of the connection origin that is reported to the Femto AP when establishing a new IPsec by receiving Activate PDP Context. CF is used in the communication of user data.

Femto AP 21*b*, upon receiving the IKE-AUTH Response, transmits an Activate PDP Context Accept to UE 3*c* (Step F29), and an IPsec Tunnel (4) is established between Femto AP 21*b* and PDG 22 (Step F30). Communication is then carried out between UE 3*c* and PDG 22 (Step F31).

Thus, in the communication system of the exemplary embodiment, messages are transmitted and received among UE 3*c*, Femto AP 21*b*, PDG 22, AAA 23, RADIUS 28, HSS 26 and HLR/AuC 16 and an authentication process of UE 3*c* is carried out. When the authentication of UE 3*c* is successful, not only is a 3G wireless concealment process carried between UE 3*c* and Femto AP 21*b*, but an IPsec Tunnel (4) is also established between Femto AP 21*b* and PDG 22 (Steps F1-F30). The process of authenticating UE 3*c* is thus carried out by way of Femto AP 21*b* during a PDP Activate, thereby enabling both a 3G wireless concealment process to be carried out between UE 3*c* and Femto AP 21*b* and an IPsec Tunnel (4) to be established between Femto AP 21*b* and PDG 22.

The above-described exemplary embodiments are ideal exemplary embodiments of the present invention, but the scope of the present invention is not limited to just the above-described exemplary embodiments, the present invention being open to various modifications within a scope that does not depart from the gist of the present invention.

For example, the communication system in the exemplary embodiment need not depend on the 3GPP Version described in Non-Patent Document 1.

Alternatively, the control operations in each device that make up the communication system in the exemplary embodiment described hereinabove can be realized by using hardware, software, or a construction that combines the two.

When a process is executed through the use of software, a program (communication program) that prescribes processing sequences can be installed in memory in a computer that is incorporated in dedicated hardware and these processes then can be executed by execution of the program by the computer. Alternatively, a program can be installed in a general-purpose computer capable of executing various processes and the processes then can be executed by execution of the program by the computer.

For example, a program (a communication program) can be recorded in advance on, as a recording medium, a hard disk or ROM (Read Only Memory). Alternatively, a program can be temporarily or permanently stored (recorded) on a removable recording medium. Such a removable recording medium can be offered as so-called package software. Examples that can be offered as a removable recording medium include: a floppy (registered trademark) disk, a CD-ROM (Compact Disk Read Only Memory), an MO (Magneto-optical) disk, a DVD (Digital Versatile Disc), a Magnetic Disk, and semiconductor memory.

The program is installed in the computer from the above-described removable recording medium. The program may be wirelessly transferred to the computer from a download site. The program may be transferred by wire to the computer by way of a network.

In addition, the communication system in the exemplary embodiment can be constructed to not only execute processes by a time series in accordance with processing operations described in the above-described exemplary embodiments, but can be constructed to execute processes in parallel or separately as necessary according to the processing capability of the devices that execute processes or according to necessity.

In addition, the communication system in the exemplary embodiment may be configured by plurality of devices, or may be configured by a construction in which various devices exist within the same case.

(Potential Utility in Industry)

The exemplary embodiment can be applied to services that use Femto-cell base stations.

Although the invention of the present application was described hereinabove with reference to each of the exemplary embodiments, the invention of the present application is not limited by the above-described exemplary embodiments. The configuration and details of the invention of the present application are open to various modifications within the scope of the invention that will be readily understood by one skilled in the art.

This application is the National Phase of PCT/JP2009/071249, filed Dec. 21, 2009, which claims priority based on Japanese Patent Application 2008-333583 for which application was submitted Dec. 26, 2008 and incorporates all of the disclosures of that application.

EXPLANATION OF REFERENCE NUMBERS 3, 11 UE (User Equipment)
12 Node-B
13 RNC (Radio Network Controller)
14 MSC (Mobile Services Switching Center)
15, 27 VLR (Visitor Location Register)
16 HLR/AuC (Home Location Register/Authentication Center)
21 Femto AP (Femto Access Point: Femto-cell base station)
22 PDG (Packet Data Gateway: relay device)
23 AAA (Authentication Authorization Accounting: authentication device)
24 P-CSCF (Proxy-Call Session Control Function: communication control device)
25 S-CSCF (Serving-Call Session Control Function: communication control device)
26 HSS (Home Subscriber Server: management device)
28 RADIUS (Remote Authentication Dial-In User Service)

The invention claimed is:

1. A communication system having at least UE (User Equipment) and an HLR (Home Location Register) that are used in an IMS (IP Multimedia Subsystem) network, and that comprises:
a femtocell base station that makes up a predetermined communication area; and a control unit which controls at least communication between said UE and said HLR; wherein:
said femtocell base station and said control unit are present between said UE and said HLR;
said femtocell base station includes a transmitting unit which transmits messages received from said UE to said control unit and which transmits messages received from said control unit to said UE;
and said control unit both converts messages received from said femtocell base station to messages that can be recognized by said HLR and converts messages received from said HLR to messages that can be recognized by said UE;
said control unit comprises:
a relay device which accepts messages received by said femtocell base station from said UE;
a management device which acquires subscriber information of said UE that is stored in said HLR and which manages subscriber information of said UE that was acquired;
an authentication device which authenticates said UE based on the messages received by said relay device from said femtocell base station and the subscriber information that is managed in said management device; and
a communication control device which controls communication by means of SIP (Session Initiation Protocol) of said femtocell base station when authentication of said UE is successful in said authentication device;
said femtocell base station identifies a message received from said UE as a message corresponding to a location registration request of a CS (Circuit Switching) service, a message corresponding to a location registration request of a PS (Packet Switching) service, or a message corresponding to a PDP (Packet Data Protocol) Activate, and transmits to said relay device a message corresponding to the message received from said UE that was identified;
said relay device transmits to said authentication device the message that was received from said femtocell base station;
said authentication device identifies the message received from said relay device as the message corresponding to the location registration request of the PS service, the message corresponding to the location registration request of the CS service, or the message corresponding to the PDP Activate and implements control according the message received from said relay device that was identified;
said femtocell base station:
identifies the message that was received from said UE as the message corresponding to the location registration request of the CS service when the message that was received from said UE is a Location Update Request and transmits to said relay device the message that contains information corresponding to the message corresponding to the location registration request of the CS service;
identifies the message that was received from said UE as the message corresponding to the location registration request of the PS service when the message that was received from said UE is an Attach Request and transmits to said relay device the message that contains information corresponding to the message corresponding to the location registration request of the PS service; and
identifies the message that was received from said UE as the message corresponding to the PDP Activate when the message that was received from said UE is an Active PDP Context Request and transmits to said relay device the message that contains information corresponding to the message corresponding to the PDP Activate;
and said authentication device:
based on information contained in the message received from said relay device, identifies the message received from said relay device as the message corresponding to the location registration request of the PS service, the message corresponding to the location registration request of the CS service, or the message corresponding to the PDP Activate.

2. The communication system according to claim 1, wherein:
said femtocell base station transmits to said relay device the message that contains IMSI (International Mobile Subscriber Identity) of said UE and IMSI of said femtocell base station; and
said authentication device carries out authentication of said UE based on the IMSI of said UE that is contained in the message received from said relay device that contains the IMSI of said UE and the IMSI of said femtocell base station and based on subscriber information that is managed in said management device.

3. The communication system according to claim 1, wherein said authentication device:

when the message received from said relay device is identified as the message corresponding to the location registration request of the PS service, implements control corresponding to the location registration of the PS service;

when the message received from said relay device is identified as the message corresponding to the location registration request of the CS service, implements control corresponding to the location registration of the CS service; and when the message received from said relay device is identified as the message corresponding to the PDP Activate, implements control corresponding to the PDP Activate.

4. A femtocell base station which accepts a message transmitted from UE (User Equipment), said femtocell base station:

identifying the message received from said UE as a message corresponding to a location registration request of a CS (Circuit Switching) service, a message corresponding to a location registration request of a PS (Packet Switching) service, or a message corresponding to a PDP (Packet Data Protocol) Activate, and transmitting to a relay device the message corresponding to the message received from said UE that was identified; and identifies the message that was received from said UE as the message corresponding to the location registration request of the CS service when the message that was received from said UE is a Location Update Request, as the message corresponding to the location registration request of the PS service when the message that was received from said UE is an Attach Request, and as the message corresponding to the PDP Activate when the message received from said UE is an Activate PDP Context Request.

5. A communication method implemented by a communication system that includes: UE (User Equipment) and an HLR (Home Location Register) that are used in an IMS (IP Multimedia Subsystem) network, a femtocell base station that makes up a predetermined communication area, and a control unit which controls at least communication between said UE and said HLR, wherein said femtocell base station and said control unit are present between said UE and said HLR; the communication method including:

transmitting wherein said femtocell base station transmits to said control unit messages received from said UE;

transmitting wherein said femtocell base station transmits to said UE messages received from said control unit;

converting wherein said unit converts messages received from said femtocell base station to messages that can be recognized by said HLR; and converting wherein said control unit converts messages received from said HLR to messages that can be recognized by said UE;

wherein:

said control unit comprises:

a relay device which accepts messages received by said femtocell base station from said UE;

a management device which acquires subscriber information of said UE that is stored in said HLR and which manages subscriber information of said UE that was acquired;

an authentication device which authenticates said UE based on the messages received by said relay device from said femtocell base station and the subscriber information that is managed in said management device; and a communication control device which controls communication by means of SIP (Session Initiation Protocol) of said femtocell base station when authentication of said UE is successful in said authentication device;

said femtocell base station identifies a message received from said UE as a message corresponding to a location registration request of a CS (Circuit Switching) service, a message corresponding to a location registration request of a PS (Packet Switching) service, or a message corresponding to a PDP (Packet Data Protocol) Activate, and transmits to said relay device the message corresponding to the message received from said UE that was identified;

said relay device transmits to said authentication device the message that was received from said femtocell base station;

said authentication device identifies the message received from said relay device as the message corresponding to the location registration request of the PS service, the message corresponding to the location registration request of the CS service, or the message corresponding to the PDP Activate and implements control according the message received from said relay device that was identified;

said femtocell base station:

identifies the message that was received from said UE as the message corresponding to the location registration request of the CS service when the message that was received from said UE is a Location Update Request and transmits to said relay device the message that contains information corresponding to the message corresponding to the location registration request of the CS service;

identifies the message that was received from said UE as the message corresponding to the location registration request of the PS service when the message that was received from said UE is an Attach Request and transmits to said relay device the message that contains information corresponding to the message corresponding to the location registration request of the PS service; and identifies the message that was received from said UE as the message corresponding to the PDP Activate when the message that was received from said UE is an Active PDP Context Request and transmits to said relay device the message that contains information corresponding to the message corresponding to the PDP Activate;

and said authentication device:

based on information contained in the message received from said relay device, identifies the message received from said relay device as the message corresponding to the location registration request of the PS service, the message corresponding to the location registration request of the CS service, or the message corresponding to the PDP Activate.

6. A communication method implemented by a femtocell base station that receives messages transmitted from UE (User Equipment), comprising:

identifying a message received from said UE as a message corresponding to a location registration request of a CS (Circuit Switching) service, a message corresponding to a location registration request of a PS (Packet Switching) service, or a message corresponding to a PDP (Packet Data Protocol) Activate;

transmitting to a relay device the message corresponding to the message that was identified; and identifying the message that was received from said UE as the message corresponding to the location registration request of the CS service when the message that was received from said UE is a Location Update Request, as the message corresponding to the location registration request of the PS service when the message that was received from said UE is an Attach Request, and as the message corresponding to the PDP Activate when the message received from said UE is an Activate PDP Context Request.

7. A memory medium that can be read by a computer and on which is recorded a communication program that is to be executed by a femtocell base station that receives messages transmitted from UE (User Equipment), said communication program causing said femtocell base station to execute processes of:

identifying a message received from said UE as a message corresponding to a location registration request of a CS (Circuit Switching) service, a message corresponding to a location registration request of a PS (Packet Switching) service, or a message corresponding to PDP (Packet Data Protocol) Activate, transmitting to a relay device the message corresponding to the message that was identified, and identifying the message that was received from said UE as the message corresponding to the location registration request of the CS service when the message that was received from said UE is a Location Update Request, as the message corresponding to the location registration request of the PS service when the message that was received from said UE is an Attach Request, and as the message corresponding to the PDP Activate when the message received from said UE is an Activate PDP Context Request.

* * * * *